(12) United States Patent
Wright, III et al.

(10) Patent No.: US 12,103,048 B2
(45) Date of Patent: Oct. 1, 2024

(54) ITEM INVENTORY MANAGEMENT SYSTEM WITH VACUUM-OPERATED SORTER

(71) Applicant: eBay Inc., San Jose, CA (US)

(72) Inventors: Cornell G. Wright, III, Boulder, CO (US); Kevin H. Lipkin, San Francisco, CA (US); Jason Raymond Evarts, Greeley, CO (US); Christopher Charles Dombrowski, Livermore, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/182,704

(22) Filed: Mar. 13, 2023

(65) Prior Publication Data

US 2023/0286020 A1    Sep. 14, 2023

Related U.S. Application Data

(60) Provisional application No. 63/319,375, filed on Mar. 13, 2022.

(51) Int. Cl.
| | |
|---|---|
| *B07C 5/36* | (2006.01) |
| *B07C 5/342* | (2006.01) |
| *B07C 5/38* | (2006.01) |
| *B25J 15/06* | (2006.01) |
| *B65G 47/91* | (2006.01) |

(52) U.S. Cl.
CPC ............ *B07C 5/365* (2013.01); *B07C 5/3422* (2013.01); *B07C 5/38* (2013.01); *B25J 15/0616* (2013.01); *B65G 47/91* (2013.01)

(58) Field of Classification Search
CPC ... B07C 5/365; B07C 5/38; B07C 2501/0063; B65G 47/91
USPC .......................................................... 209/587
See application file for complete search history.

(56) References Cited

U.S. PATENT DOCUMENTS

| | | | |
|---|---|---|---|
| 4,335,960 A * | 6/1982 | Ashcroft | G01N 21/90 250/223 B |
| 10,676,299 B2 * | 6/2020 | Lawlor | B65G 47/91 |
| 2022/0072587 A1 * | 3/2022 | Gealy | B07C 3/06 |

* cited by examiner

*Primary Examiner* — Michael McCullough
*Assistant Examiner* — Jessica L Burkman
(74) *Attorney, Agent, or Firm* — FIG. 1 Patents

(57) ABSTRACT

An item sorting system is described. The item sorting system includes at least one bin that holds items to be sorted and a light source that illuminates the items stored in the at least one bin. In implementations, the at least one bin includes walls that direct light, received from the light source via a first surface, for emission via a second surface facing an interior of the at least one bin. The item sorting system further includes a recognition device that identifies the items for use in sorting the items. The item sorting system further includes an end effector that manipulates the items during sorting. In some implementations, the end effector includes tips that apply a gentle vacuum force to individually manipulate items in a manner that allows for efficient sorting without damaging the items.

20 Claims, 16 Drawing Sheets

ITEM INVENTORY MANAGEMENT SYSTEM WITH VACUUM-OPERATED SORTER

PRIORITY

This application claims priority to U.S. Provisional Patent Application No. 63/319,375, filed Mar. 13, 2022 and titled "Item Inventory Management System with Vacuum Operated Robotic Card Sorter," the disclosure of which is hereby incorporated by reference in its entirety.

FIELD

The present disclosure generally relates to automated item sorting.

BACKGROUND

Cards, such as playing cards for card games, collectible cards, trading cards, and the like, are often stored in stacks. For various reasons (e.g., resulting from normal use of the cards), card stacks commonly become disorganized. Sorting disorganized cards is a challenge that becomes increasingly difficult when dealing with larger stacks of cards. Disorganized card stacks, for instance, make it difficult to identify contents of the card stack (e.g., difficult to identify individual cards included in the stack). In an effort to identify contents of a card stack, conventional approaches seek to reorganize a stack of cards in a preferred order, which is dependent on the type of cards being sorted as well as the entity sorting the cards.

Many conventional card sorting approaches involve manual sorting of cards (e.g., by a human using their hands to arrange a stack of cards in a preferred sort order). While conventional sorting approaches that involve manual human sorting are generally less destructive than machine-based card sorting systems, they often impart some level of damage to the card (e.g., via transfer of dirt, oils, and other materials from a human hand to a card surface), which consequently degrades a quality and value of the card. As another drawback, the efficiency and accuracy conventional manual sorting approaches are dependent on a recognition ability, dexterity, and memory of a human performing the manual sorting. As such, manual card sorting approaches are subject to human error and unreliable with respect to speed and accuracy.

As an alternative to manual sorting, some conventional approaches implement machines (e.g., robots) to sort a stack of cards. While machine-based card sorting approaches are generally faster and more reliable with respect to sorting accuracy than manual-based approaches, machine-based card sorting systems often impart more damage on cards relative to manual card sorting techniques. As an example, some machine-based card sorting approaches leverage currency counter technology, which involves using wheels to apply force to one or more surfaces of a card and pull cards through a slot for individual card identification. While such machine-based approaches are able to rapidly identify and handle large quantities of cards, these machine-based approaches have enormous potential to damage the cards because currency-counter systems are designed for handling currency that is routinely taken out of circulation and replaced. In extreme circumstances, damage results in a card being unsuitable for play or entirely losing underlying value.

Consequently, both manual and machine-based conventional approaches for card sorting suffer from significant drawbacks and there remains a need to automate card sorting in a manner that mitigates human error and damage.

SUMMARY

An item inventory management system with a vacuum-operated sorter is described. In implementations, the item inventory management system may include a plurality of bins that are each configured to hold items for sorting. The system further may include an item handling system configured to position an end effector relative to individual ones of the plurality of bins. The end effector may include at least one tip that is configured to apply a vacuum force to an item in a manner that securely and gently adheres the item to the end effector for removal from the bin. In some implementations, the end effector is further configured with a curvature generation device that imparts a curvature on an item intended to be adhered to the end effector and avoids one or more other items from inadvertently adhering to an item being manipulated.

The item inventory management system further may include at least one light source and a recognition device to illuminate and identify items stored in the bins for sorting. In this manner, the item inventory management system is thus configured to efficiently sort items in a manner that avoids item damage and achieves a range of different sort orders as guided by a range of different sort algorithms.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1A:
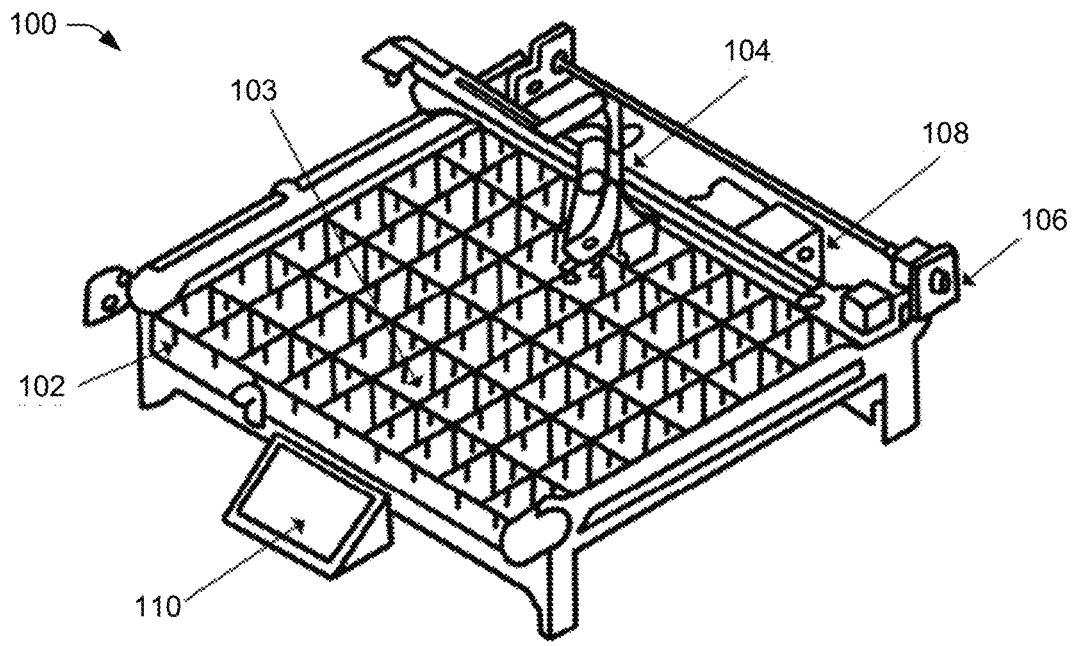
FIG. 1A illustrates a first perspective view of an example item sorting system configured to perform functionality described herein.

Many conventional item sorting approaches involve manual sorting (e.g., by humans using hands to arrange items in a preferred sort order). While conventional sorting approaches that involve manual human sorting are generally less destructive than machine-based sorting systems, they often impart some level of damage to the item. As another drawback, the efficiency and accuracy conventional manual sorting approaches are dependent on a recognition ability, dexterity, and memory of a human performing the manual sorting. As such, manual item sorting approaches are subject to human error and unreliable with respect to speed and accuracy.

As an alternative to manual sorting, some conventional approaches implement machines (e.g., robots) to sort items. While machine-based sorting approaches are generally faster and more reliable with respect to sorting accuracy than manual-based approaches, machine-based sorting systems often impart more damage relative to manual card sorting techniques. Consequently, both manual and machine-based conventional approaches for item sorting suffer from significant drawbacks and there remains a need to automate card sorting in a manner that mitigates human error and damage.

To address these conventional problems, an item sorting system configured as part of an item inventory management system is described. The item sorting system includes a bin system, an item handling system, a drive system, and a control system. The bin system holds and stores items (e.g., items to be sorted, inventoried, managed, or combinations thereof). The item handling system and the drive system operate in combination to individually move items stored in the bin system. The control system is configured to control movement and operation of the item handling system as well as the drive system to facilitate sorting of items stored in the bin system. In some implementations, the control system is representative of control electronics and supporting software, firmware, or combinations thereof to facilitate operation of the systems described herein.

To avoid the damage imparted on items by conventional sorting systems, the item handling system includes an end effector that is configured to apply a vacuum force to an individual item stored in the bin system in a manner that securely affixes the item to the item handling system without imparting damage to the item (e.g., without scratching or abrasively contacting a surface of the item, without imparting a curvature on a surface of the item that exceeds a threshold bend radius for the item, and so forth). To further ensure accurate and reliable sorting operations, in some implementations the item handling system is configured as including at least one curvature generation device. The curvature generation device is designed to ensure that only a single item (e.g., only one card) is manipulated at a given time during item sorting.

Advantageously, the item handling system is thus configured to avoid unpredictable sorting behavior facing conventional systems that often inadvertently manipulate multiple items during a given sort operation (e.g., inadvertently sort two items during a sort operation that was intended to sort a single item). As such, the item handling system avoids conventional unpredictable behavior, which is detrimental to efficient and reliable item sorting, as inadvertent item manipulation results in an unintended sort order.

In some configurations, the item handling system includes a light source and a recognition device. The light source is configured to illuminate objects stored within the bin system for recognition by the recognition device. In some implementations, the bin system is constructed with walls that are at least partially transparent or translucent and thus allow for light to pass from the light source through bin walls, which enables improved visual item recognition relative to conventional item sorting systems. In some implementations walls of the bins include at least one air passage to enable air to flow between adjacent bins, which improves a likelihood of item separation an improves an efficiency and accuracy of the overall sorting process.

The item sorting system described herein thus represents an improvement over conventional item sorting systems and enables for efficient sorting of a range of different items in a manner that avoids item damage that results from conventional system architectures.

Item Sorting System

Figure 1B:
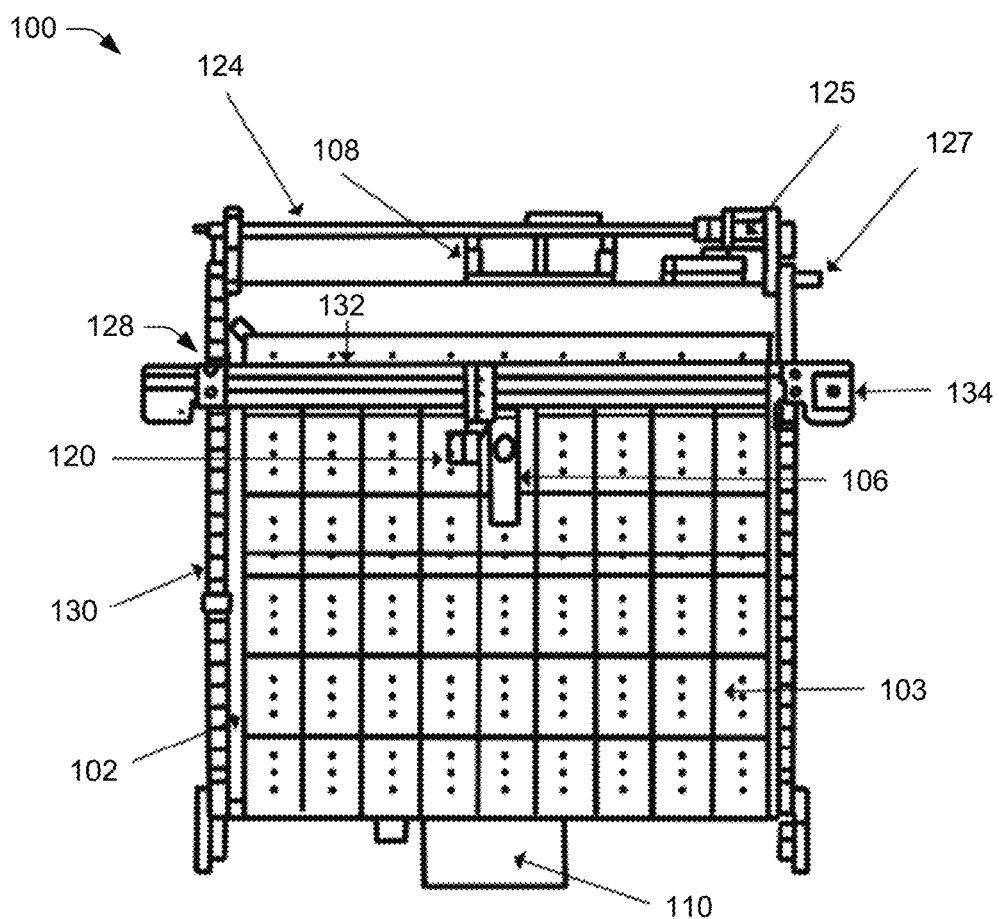
FIG. 1B illustrates a second perspective view of the example item sorting system illustrated in FIG. 1A.
Figure 1C:
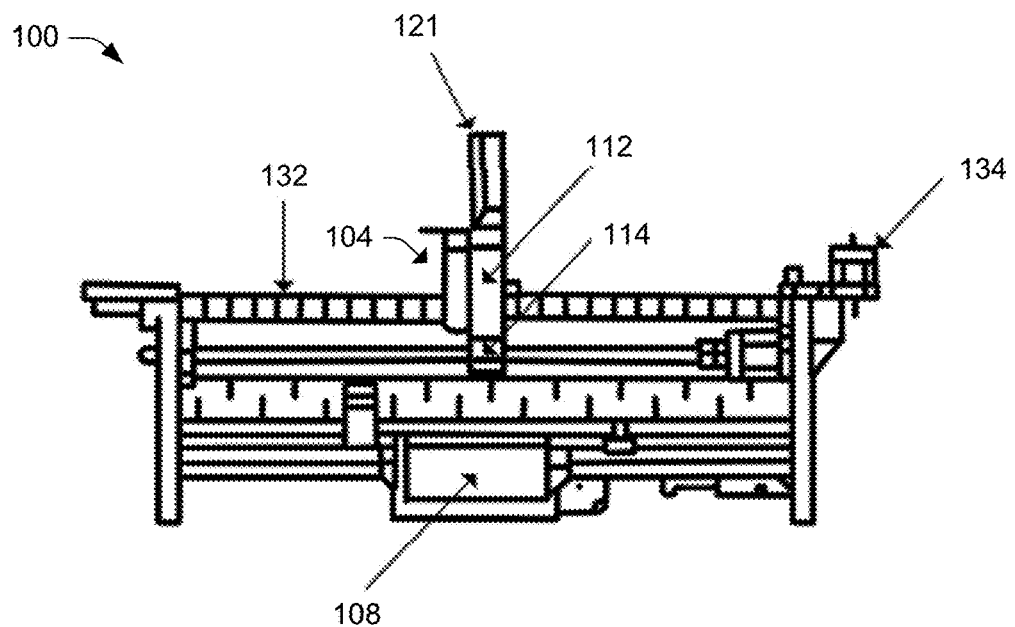
FIG. 1C illustrates a third perspective view of the example item sorting system illustrated in FIGS. 1A and 1B.
Figure 1D:
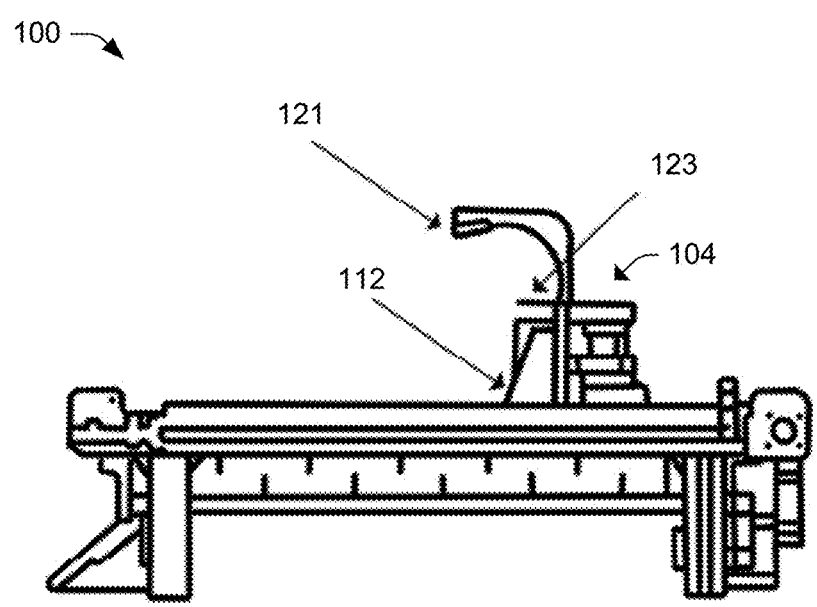
FIG. 1D illustrates a fourth perspective view of the example item sorting system illustrated in FIGS. 1A-1C.

FIG. 1A illustrates a first perspective view of an example item sorting system 100 configured to perform functionality described herein. FIG. 1B illustrates a second perspective view of the example item sorting system illustrated in FIG. 1A, FIG. 1C illustrates a third perspective view of the example item sorting system illustrated in FIG. 1A, and FIG. 1D illustrates a fourth perspective view of the example item sorting system illustrated in FIG. 1A.

Although the item sorting system 100 is described in the context of an apparatus or a device including specific components to enable the functionality described herein, in implementations the item sorting system 100 is configurable as including additional components or fewer components than those described and illustrated in accordance with the disclosed techniques.

The item sorting system 100 includes a bin system 102, an item handling system 104, a drive system 106, a control system 108, and an interface 110. The bin system 102 represents functionality of the item sorting system 100 to hold and store items (e.g., items to be sorted, inventoried, managed, or combinations thereof). In some implementations, the bin system 102 is configured to hold and store cards. To do so, the bin system 102 is depicted as including a plurality of bins 103, where each bin of the plurality of bins 103 is configured to store a stack of at least one card to be sorted by the item sorting system 100. A stack of cards included in a respective bin of the plurality of bins 103 thus represents an input to the item sorting system 100. In implementations, the item sorting system 100 is configured to identify individual cards included in each of the bins 103 using an image recognition algorithm trained to visually identify items, such as a recognition algorithm implemented by the inventory management system described in further detail below with respect to FIG. 4. Examples of cards that a recognition algorithm is trained to identify include, for example, Magic: The Gathering®, Pokemon®, Yugioh®, baseball, playing cards, and other cards involved in card-based games or otherwise having at least one printed surface. Although the systems and techniques are described herein in the context of being used to sort items configured as cards, the item sorting system 100 is useable to sort items other than cards, such as toys, blocks, fasteners (e.g., nails and screws), and other objects having visually distinguishable characteristics from one another.

The item handling system 104 and the drive system 106 operate in combination to individually move items stored in the bins 103 (e.g., one at a time). In implementations, the item handling system 104 and the drive system 106 are configured to move items stored in the bins 103 via linear motion along one or more axes. For instance, the drive system 106 is configured to employ separate axes for each planar dimension of the bins 103 to coordinate positioning and placement of the item handling system 104 relative to (e.g., centered over a particular one of the bins 103, centered over an item stored in the particular one of the bins 103, and so forth). The separate axes used to position the item handling system 104 over a bin may be referred to as an x-axis and a y-axis in a Cartesian coordinate system, where a z-axis corresponds to a "depth" of a bin, such as an axis along which the perspective view of FIG. 1B is observed.

The item handling system 104 and the drive system 106 are thus configured to individually move cards (e.g., one at a time) by removing a card from one of the bins 103 and placing the card in another one of the bins 103, or in a designated location different from the bins 103. To do so, the item handling system 104 is configured to operate generally above the bins 103 and reach down into individual ones of the bins 103 to retrieve a stored item from a bin or deposit an item retrieved from a different bin (e.g., using at least one vacuum end effector tip as described in further detail below).

The control system 108 is configured to control movement and operation of the item handling system 104 as well as the drive system 106 to facilitate sorting of items stored in the bins 103. In some implementations, the control system 108 is representative of control electronics and supporting software, firmware, or combinations thereof to facilitate operation of the item handling system 104 and the drive system 106. For instance, in some implementations the control system 108 is configured as including a control board (e.g., a Smoothieboard®, an Arduino®, a Duet®, combinations thereof, and so forth) that is programmed to control mechanical operation of the item sorting system 100 (e.g., by actuating one or more stepper motors of the item sorting system 100 as described in further detail below). In some implementations, a control board of the control system 108 is programmed using one or more algorithms that are designed to identify items stored in the bin system 102 and manipulate items relative to the bins 103 (e.g., remove items from or place items into individual ones of the bins 103).

Examples of one or more algorithms that are designed to identify and control manipulation of items stored in the bin system 102 include simple patience algorithms, greedy algorithms, complex optimization algorithms such as genetic algorithms, branch and bound algorithms, other algorithms as described in "Introduction to Algorithms" by T. Cormen, combinations thereof, and so forth. In accordance with one or more implementations, the at least one algorithm implemented by the control system 108 is tasked with minimizing a time involved in sorting items stored in the bin system 102. A control system implemented as part of the control system 108 is thus configurable using various combinations of processors, microcontrollers, memory, buses, and the like to operate the item sorting system 100. Alternatively or additionally, the control system 108 is configurable to include one or more communication ports that enable computing devices other than the control system 108 to communicate with and/or control the control system 108. In this manner, the control system 108 is representative of an instance of an inventory management system, such as the inventory management system 420 described and illustrated in further detail below with respect to FIG. 4.

The interface 110 is representative of a user interface output via a display device of the item sorting system 100, and specifically of a user interface that enables a user of the item sorting system 100 to interact with (e.g., control) the item sorting system 100. In accordance with the techniques described herein, the interface 110 is representative of any suitable type of interface that enables a human user to communicate with (e.g., provide input to) the item sorting system 100. For instance, the interface 110 is representative of one or more controls such as a keyboard, a keypad, a scroll wheel, a dial, one or more buttons, a number pad, a directional pad, combinations thereof, and so forth. Further, although described in the context of being controls that are provided via a display device (e.g., a virtual display, a touch screen, and so forth), the interface 110 is representative of physical counterparts of the above-mentioned controls (e.g., a physical keyboard configured to provide input to the item sorting system 100 via manual depression of keyboard keys).

Alternatively or additionally, the interface 110 is representative of a communication interface that provides a communicative coupling between the item sorting system 100 and a computing device of a human user (e.g., a mobile phone, a computer, a laptop, a tablet, a wearable device, combinations thereof, and so forth). In some implementations, the interface 110 is configured to receive input (e.g., from a human user) defining aspects involved in controlling operation of the item sorting system 100 (e.g., defining a sorting algorithm to be used, specifying an individual item or type of item to be sorted, defining a sort order, defining a destination location at which sorted items are to be placed, combinations thereof, and so forth).

In accordance with the techniques described herein, the item sorting system 100 is configured to manipulate a stack of items maintained in the bins 103 (e.g., cards) by sorting the items according to parameters specified by a sorting algorithm. For instance, in implementations a user of the item sorting system 100 specifies an order for an unsorted stack of items to be rearranged for output as an ordered set. As a specific example, in some implementations the sorting algorithm defines a subset of the bins 103 as buffer bins, where buffer bins are used for temporary placement of items during sorting, such that items removed from an input stack (e.g., an unsorted stack) are temporarily placed into one or more buffer bins before ultimately being placed in one or more of the bins 103 defined as output bins, relative to other items of the unsorted stack.

As illustrated in FIG. 1C, the item handling system 104 includes an end effector 112, which in turn includes at least one end effector tip 114. The end effector tip 114 represents functionality of the end effector 112 to apply a vacuum force to an individual item stored in the bin system 102 in a manner that securely affixes the item to the end effector 112 without imparting damage to the item (e.g., without scratching or abrasively contacting a surface of the item, without imparting a curvature on a surface of the item that exceeds a threshold bend radius for the item, and so forth). Using the at least one end effector tip 114, the end effector 112 represents functionality of the item sorting system 100 to pick up, move, and release an item as part of sorting items within the bins 103. To do so, the end effector 112 is configured to apply a vacuum force (e.g., a negative pressure) to at least one surface of an item. By applying the vacuum force to an area of the item, the at least one end effector tip 114 applies a holding force that secures the item to the end effector 112.

In some implementations, the vacuum force is generated by a pump, a syringe, or the like, which evacuates a gas or a liquid (e.g., air) from an enclosed volume within the end effector 112. By evacuating the gas or liquid from the enclosed volume within the end effector 112, the end effector 112 and/or the at least one end effector tip 114 is configured to actuate an extend forwards an item disposed in one of the bins 103. For instance, the end effector 112 extends from a resting position generally downward towards a base of a bin. While extending towards the base of a bin, the at least one end effector tip 114 is caused to contact an item in the bin located closest to the end effector 112 (e.g., a top-most card of a stack of cards stored in the bin).

Upon contacting the item, the vacuum force generated by evacuating the gas or liquid from the enclosed volume within the end effector 112 causes the at least one end effector tip 114 to create a seal between the item and the end effector tip 114. Upon creating the seal between the item and the at least one end effector tip 114, the vacuum force causes the end effector 112 to retract back towards its resting position while maintaining the item adhered to the end effector via the at least one end effector tip 114. In implementations, the at least one end effector tip 114 is constructed using one or more materials that mitigate (e.g., avoid) potential damage to the item adhered to the end effector tip. For instance, the at least one end effector tip 114 is constructed using a soft rubber, a foam, a plastic polymer, silicone, or combinations thereof. Via this material construction, the end effector tip 114 is designed to flexibly deform upon contact with an item in a manner that creates a seal securing the item to the end effector tip, while gently touching the item in a manner that avoids abrasive contact or otherwise imparting damage to the item.

In accordance with one or more implementations, the end effector 112 includes a solenoid or similar type of switch that controls behavior of the end effector 112 and its at least one end effector tip 114 (e.g., causes the end effector to avoid imparting a threshold amount of force on an item, where the threshold amount of force is configurable based on a type of item being contacted). A vacuum force and kinetic motion applied by the end effector 112 on an item collectively manipulate the item in a manner that enables for other (e.g., opposing) forces to decouple the item from the end effector 112, thus enabling for efficient item sorting in a manner that avoids damage imparted by conventional item sorting systems and techniques. This force combination is similar in nature to the decoupled lift and thrust force system employed by aircraft systems (e.g., decoupled lift systems of aircraft wings and thrust systems of aircraft engines).

As illustrated in FIG. 1D, the item handling system 104 is configured to include a light source 121 in accordance with one or more implementations. Alternatively or additionally, the item handling system 104 is configured as including a recognition device 123. The light source 121 represents illumination functionality of the item sorting system 100 to illuminate objects stored within the bins (e.g., for recognition by the recognition device 123). In implementations, the light source 121 is representative of any type of device that produces electromagnetic radiation, such as a light, a lamp, a laser, combinations thereof, and so forth. As one specific example, the light source 121 is configured as a light emitting diode (LED) that supports adjustable light emission (e.g., adjustable colors and/or intensity of light emitted by the light source 121). Other example configurations of the light source 121 include one or more incandescent bulbs, one or more halogen bulbs, one or more fluorescent lamps, one or more high-intensity discharge (HID) lamps, one or more organic LEDs, one or more laser diodes, combinations thereof, and so forth. The recognition device 123 is representative of any suitable type of electronic device configured to detect reflected electromagnetic radiation from items (e.g., items stored in the bins 103), such as a digital camera or other image capturing apparatus. By implementing both the light source 121 and the recognition device 123, the item sorting system 100 is configured to identify items stored in the bins 103 independent of contacting the items.

Figure 1E:
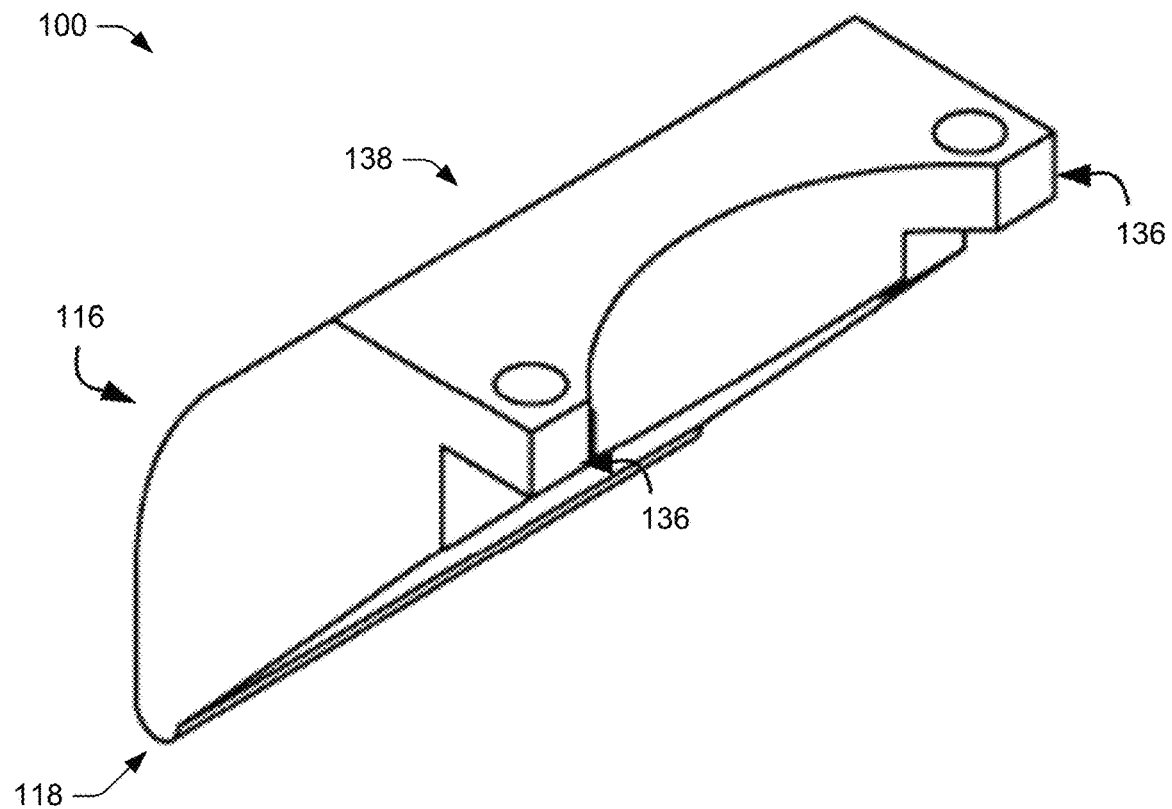
FIG. 1E illustrates an example curvature generation device implemented as part of the example item sorting system illustrated in FIGS. 1A-1D.
Figure 1E:
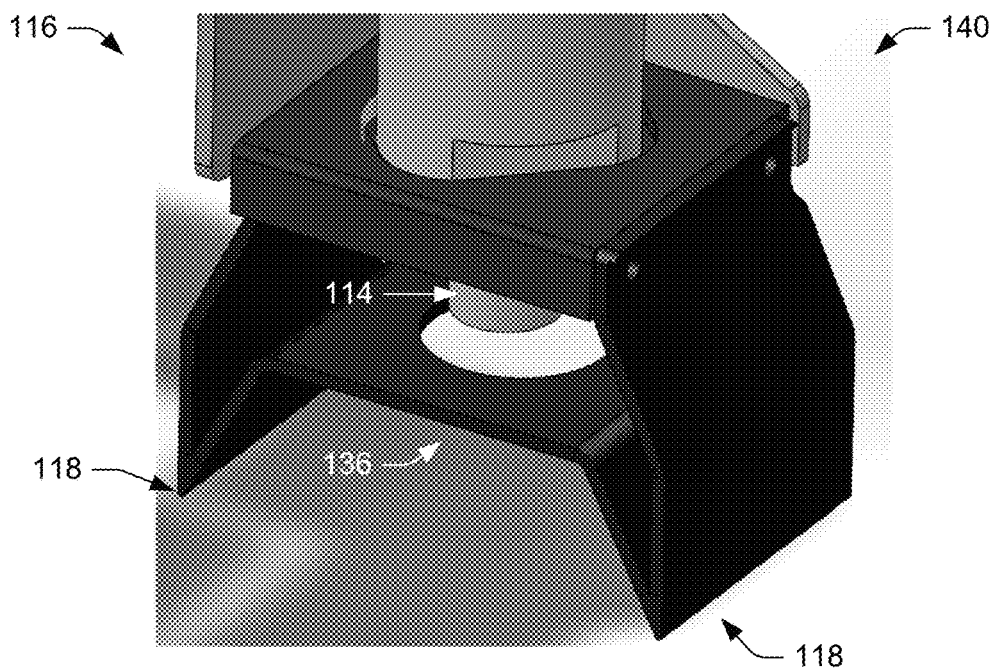

FIG. 1E illustrates an example curvature generation device implemented as part of item sorting system 100. As depicted in the illustrated example of FIG. 1E, in some implementations the end effector 112 is configured as including at least one curvature generation device 116. The curvature generation device 116 is designed to ensure that only a single item (e.g., only one card) is manipulated at a given time by the end effector 112 during item sorting. As a specific example, consider a scenario where a stack of cards are being sorted by the item sorting system 100. In this specific example, due to the flatness and smoothness of surfaces of a card that contact one or more other cards in the stack, when a top card in a stack is adhered to the end effector 112, one or more cards below the top card may be inadvertently manipulated by the end effector 112 (e.g., via static forces between the top card and one or more other cards that transfer force imparted by the end effector 112 to the top card to the one or more other cards). In this specific example, it is possible for the end effector 112 to inadvertently manipulate (e.g., lift and/or move) more than the top card, particularly during rapid operation of the item sorting system 100. In many implementations, a number of items (e.g., cards) that are inadvertently manipulated is unpredictable, given the variable factors that cause items to stick together, such as static forces, oils, and other surface contaminants on different items, and so forth. This unpredictable behavior is detrimental to efficient and reliable item sorting, as inadvertent item manipulation often results in an unintended sort order.

To avoid such inadvertent item manipulation, the curvature generation device 116 is configured to impart a curvature on an item adhered to the end effector 112 via the at least one end effector tip 114. The curvature imparted on an item by the curvature generation device 116 thus debilitates forces (e.g., static forces) that otherwise cause inadvertent manipulation of items by sticking items together. In some implementations, the curvature generation device 116 is designed to impart a curvature on an item when the end effector 112 is fully retracted (e.g., disposed in a resting position) while an item is adhered to the end effector 112. Continuing the example scenario above where the item sorting system 100 is sorting cards, the curvature generation device 116 causes cards stuck below a top card to detach from the top card and fall back into one of the bins 103 while the top card maintains adhered to the end effector 112.

In implementations, imparting curvature on an item intended to be manipulated during a given sort operation decreases a surface area of the item intended to be manipulated that contacts one or more other items not intended to be manipulated during the given sort operation. In this manner, the curvature generation device 116 ensures manipulation of a single item during the given sort operation, which enables reliable item identification and transportation among different ones of the bins 103. In some implementations, the curvature generation device 116 is designed to be a passive component of the item sorting system 100, such that sensors, electronics, and/or moveable mechanisms are not required to achieve functionality of the curvature generation device 116.

For instance, in the illustrated example of FIG. 1E, the curvature generation device 116 is configured as at least one post 118, which is designed to extend opposing sides of the end effector tip 114. The curvature generation device 116 illustrated in FIG. 1E is thus designed to contact portions of the item that would otherwise contact the opposing sides of the end effector tip 114 where the posts 118 are disposed. Alternatively or additionally, in some implementations the curvature generation device includes a different number of posts 118 (e.g., one or more posts), a different configuration of posts (e.g., disposed at other locations relative to the end effector tip 114), or combinations thereof, relative to the example configuration illustrated in FIG. 1E. The at least one post 118 depicted in FIG. 1E biases an item contacted by the curvature device 116 to bend towards a point (e.g., surface 136) of the curvature generation device 116 when subjected to a curvature imparted by the curvature generation device 116. For instance, FIG. 1E depicts a cutout view 138 of the curvature generation device 116 which represents how a full view 140 of the curvature generation device 116 implements an end effector tip 114 of the curvature generation device 116 to bias curvature of a connected item towards the surface 136 using posts 118.

Figure 1F:
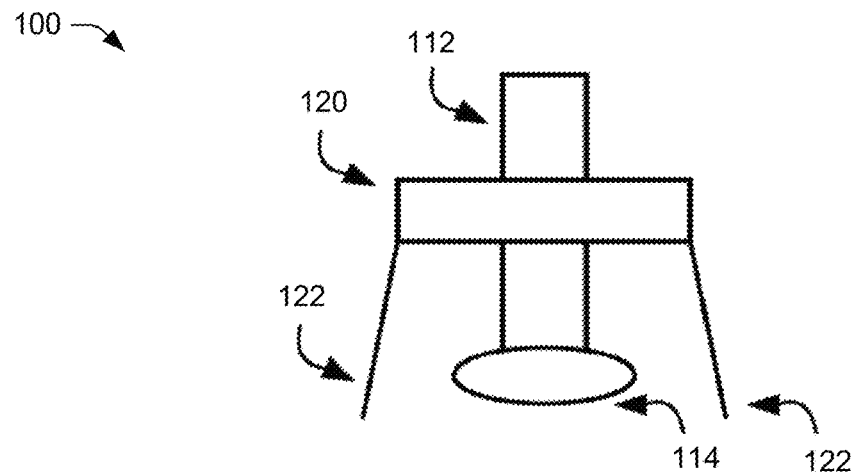
FIG. 1F illustrates another example curvature generation device implemented as part of the example item sorting system illustrated in FIGS. 1A-1D.

FIG. 1F illustrates another example of a curvature generation device implemented as part of the item sorting system 100. In the illustrated example of FIG. 1F, curvature generation device 120 is depicted as including two posts 122. The curvature generation device 120 is depicted as being positioned on the end effector 112, such that the posts 122 extend below the end effector tip 114. In this manner, the two posts 122 of the curvature generation device 120 are designed to interact with portions of an item adhered to the end effector tip 114 in a way that imparts a curvature on the item when the end effector tip is retracted towards a portion of the curvature generation device from which the posts 122 protrude (e.g., when an item adhered to the end effector tip 114 is retracted from one of the bins 103).

Figure 1G:
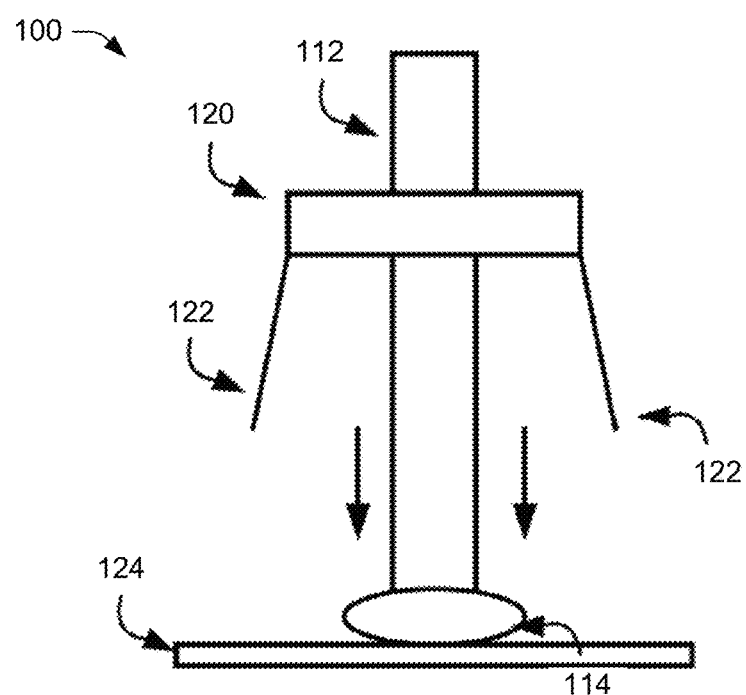
FIG. 1G illustrates the example curvature generation device of FIG. 1F in further detail.

FIG. 1G illustrates an example operation of the end effector 112 contacting an item, such as card 124, and adhering the card 124 to the end effector tip by extending the end effector tip 114 away from the curvature generation device 120. As described above, the end effector 112 is configured to create a seal (e.g., using vacuum force) between the end effector tip 114 and the card 124, which thus causes retraction of the end effector 112 while the card 124 is adhered to the end effector tip 114.

Figure 1H:
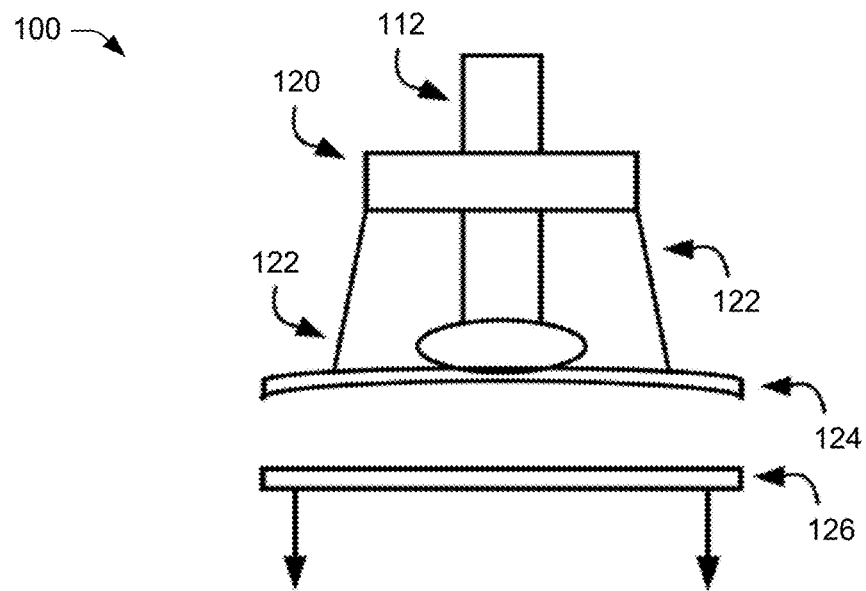
FIG. 1H illustrates the example curvature generation device of FIGS. 1F and 1G in further detail.

FIG. 1H illustrates an example of the end effector 112, having the card 124 adhered to the end effector tip 114, retracting towards the curvature generation device 120 to a point where the posts 122 contact the card 124. Upon contacting the card 124, and while the end effector tip 114 is retracting towards a base of the curvature generation device 120 from which the posts 122 protrude, the posts 122 are designed to impart a curvature on the card 124. FIG. 1H illustrates a scenario where at least one additional card 126 that was previously stuck to the card 124 (e.g., prior to impartation of the curvature generated by curvature generation device 120) is caused to be separated from the card 124 and thus no longer inadvertently manipulated by the end effector 112. In this manner, the curvature generation device 120 is designed to overcome a static force that adhered the at least one additional card 126 to the card 124 and cause the at least one additional card 126 to fall back into one of the bins 103.

Figure 1I:
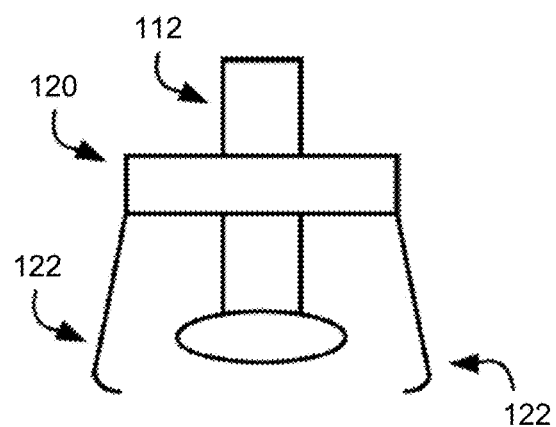
FIG. 1I illustrates an example configuration of the example curvature generation device of FIGS. 1F-1H in accordance with one or more implementations.

In implementations, the curvature generation device 120 is constructed using any one or more materials, such as metal, plastic, combinations thereof, and so forth. Although illustrated and described above in the context of specific example configurations, the posts 122 are configurable in any shape or arrangement that imparts a curvature on an item adhered to the end effector tip 114. For example, as illustrated in FIG. 1F, the posts 122 are configurable using a square or rectangular plate with a flat edge that protrudes away from the square or rectangular plate along an angle. Alternatively or additionally, as illustrated in FIG. 1I, the posts 122 are configurable as including a curved edge. In this manner, the posts 122 are configurable in a variety of manners without departing from the spirit or scope of the techniques described herein.

Figure 1J:
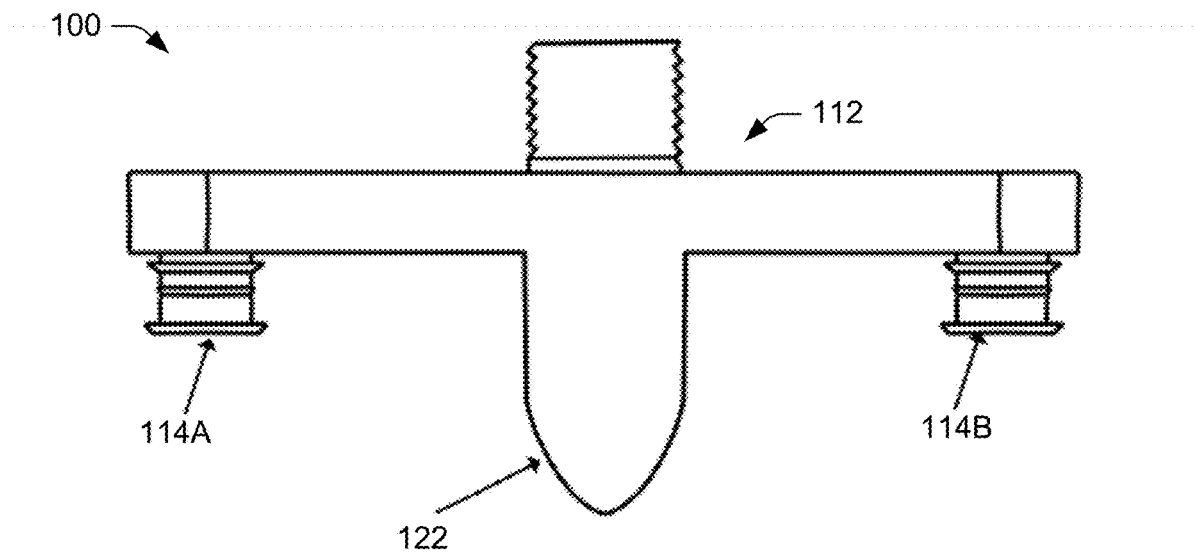
FIG. 1J illustrates an example curvature device implemented as part of the example item sorting system illustrated in FIGS. 1A-1D.

FIG. 1J illustrates another example configuration of a curvature generation device implemented by the item sorting system 100. As depicted in the illustrated example of FIG. 1J, the end effector 112 includes a single post 122 disposed between two end effector tips, such as end effector tip 114A and end effector tip 114B. In some implementations, the end effector tip 114A and the end effector tip 114B are representative of suction cups disposed on the end effector 112, such as suction cups constructed using a soft rubber, a foam, a plastic polymer, silicone, or combinations thereof. The end effector tip 114A and the end effector tip 114B and configurable in implementations to be positioned as extending from the end effector 112 at an approximately same level as the post 122 when vacuum force is applied to the end effector tips and the end effector 112 is caused to lower into one of the bins 103. In such a configuration, when lowered into a bin, the end effector tips 114 and the post 122 are caused to contact an item (e.g., the card 124). The vacuum force is then imparted on the item via the end effector tip 114A and end effector tip 114B, which forms a seal and adheres the item to the end effector 112.

By creating a seal adhering the item to the end effector tips, the end effector tip 114A and end effector tip 114B are caused to retract upwards (e.g., towards a surface of the end effector 112 on which the end effector tips are disposed) which causes the post 122 to impart a gentle curvature upon the item adhered to the end effector tips. In implementations where the end effector tip 114A and end effector tip 114B are configured as suction cups, retraction of the suction cups involves the folding and compression of one or more suction cup bellows. In implementations where the item adhered to the end effector tips is the card 124, the gentle curvature imparted on card 124 causes any additional cards that may have been inadvertently stuck to the card 124 (e.g., at least one additional card 126) to fall back into a bin from which the card 124 was retrieved.

Figure 1K:
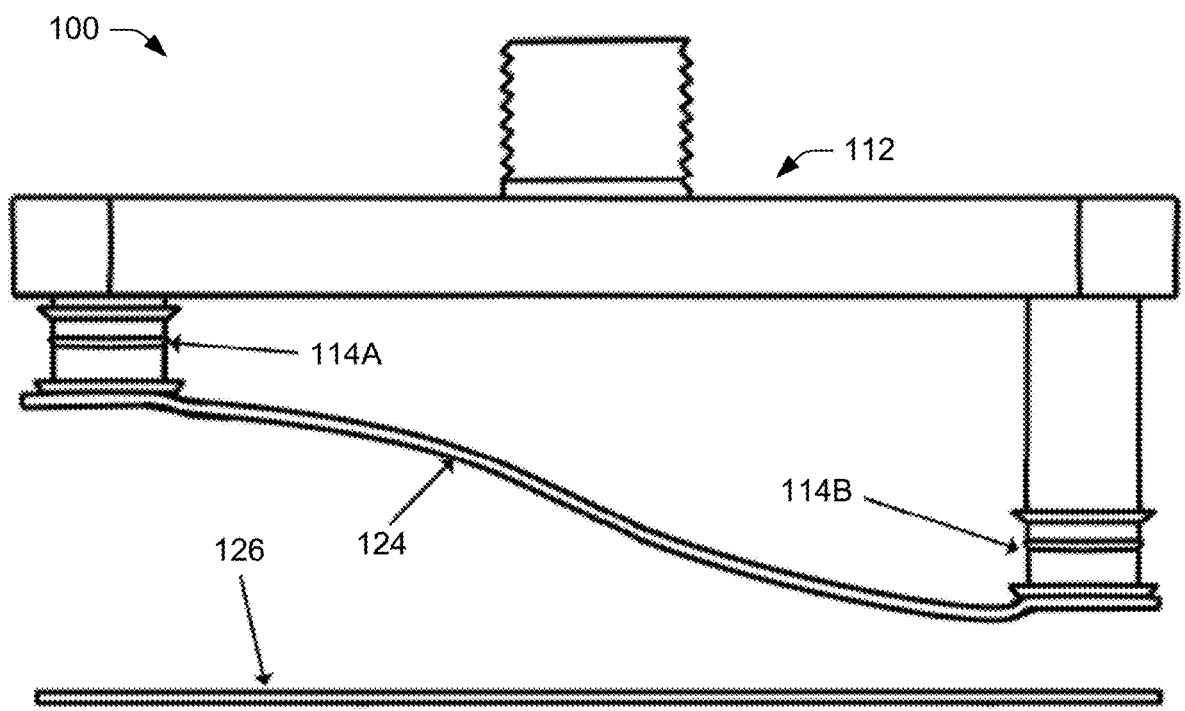
FIG. 1K illustrates an example curvature device implemented as part of the example item sorting system illustrated in FIGS. 1A-1D.

FIG. 1K illustrates another example curvature device implemented as part of the item sorting system 100. As depicted in the illustrated example of FIG. 1K, the end effector 112 is configured as a curvature device independent of (e.g., without) one or more posts, such that the end effector tip 114A and end effector tip 114B operate to impart curvature on an item adhered to the end effector tip 114A and end effector tip 114B. To do so, the end effector tip 114A and end effector tip 114B are configured to asymmetrically react towards a surface of the end effector 112 upon which the end effector tips are disposed. Specifically, in the illustrated example of FIG. 1K, end effector tip 114A is retracted towards a surface of the end effector 112 to a greater degree than the end effector tip 114B while both the end effector tip 114A and the end effector tip 114B are adhered to the card 124. Imparting curvature on the card 124 is performable at any suitable stage in an item sorting process operation, such as while the card 124 is still in contact with other cards stacked in a bin, while lifting the card from the bin, or after reaching a predetermined position over the bin.

As a specific example, the end effector 112 is lowered into a bin until the end effector tip 114A and the end effector tip 114B contact the card 124. In this specific example, upon applying a vacuum force to the card 124 via the end effector tip 114A and the end effector tip 114B, the end effector tip 114A is retracted towards a surface of the end effector 112 upon which the end effector tips are disposed. Continuing this specific example, while the end effector tip 114A retracts, end effector tip 114B remains located at a position where the end effector tip 114B first contacted the card 124. By retracting a side of the card 124 adhered to the end effector tip 114A without moving a side of the card 124 adhered to the end effector tip 114B, the end effector 112 effectively "peels" the card 124 from the at least one additional card 126, thus individually separating the card 124 from other cards of a stack. In implementations, end effector tip 114B is configured to hold the card 124 in place through friction of the tip with the card surface, through creating a seal with a vacuum force, or combinations thereof.

In some implementations, individual end effector tips 114 are configured to control pitch and roll of an item adhered to the end effector tips 114 (e.g., about any suitable axis to tilt or twist the item adhered to the end effector 112. As a specific example, the end effector tip 114A is configured to pitch one side of the card 124 in a first direction while the end effector tip 114B is configured to pitch another side of the card 124 in a second direction that is opposite the first direction. In this specific example, the opposite pitching causes an apex of a bend in the card 124 to push towards a surface of the end effector 112 upon which the end effector tips 114 are disposed, towards the at least one additional card 126, or a combination thereof. As another example, pitching different points of contact on an item causes the item to deform in a twisting manner, thus reducing surface area of the card 124 contacting the at least one additional card 126 and forcing the at least one additional card 126 to fall back into the bins 103 (e.g., via positioning of the end effector 112 over a bin, via the at least one additional card 126 contacting a chamfered edge that biases items into the bin, or a combination thereof).

Returning to FIGS. 1A and 1B, the drive system 106 is configured to move the item handling system 104 (e.g., using two-dimensional linear motion) to position the item handling system 104 over the bins 103. To do so, the drive system 106 is configured as including a coupling rod 125, a stepper motor 127, an end stop 128, linear rails 130, gantries 132, and a stepper motor 134. The gantries 132 are driven by one or both of the stepper motor 127 and the stepper motor 134 which push and pull the gantries 132 along at least one track (e.g., along linear rails 130). In implementations, the gantries 132 are driven in combination with a belt drive, direct driver, rack and pinion, or lead screws. For instance, in some implementations individual stepper motors control individual axes of travel of the item handling system 104. As a specific example, in a Cartesian coordinate system where a depth of the bins 103 corresponds to a z-axis and different bins 103 are arranged relative to one another along an x-axis and a y-axis, stepper motor 127 is configured to control motion of the item handling system 104 along the x-axis and stepper motor 134 is configured to control motion of the item handling system 104 along the y-axis. To reduce friction during travel, ball bearings or ball bearing carriages may be used with the linear rails 130. In this manner, the item sorting system 100 is configured to enable motion of the end effector 112, the light source 121, the recognition device 123, or combinations thereof, according to direction provided by the control system 108 to facilitate sorting of items disposed in the bin system 102.

During a given item identification cycle, for instance, the control system 108 causes the drive system 106 to position at least one of the end effector 112, the light source 121, or the recognition device 123 over a bin (e.g., via the coupling rod 125). In positioning the item handling system 104, or individual components thereof, the drive system 106 moves the item handling system to a position, relative to the bins 103, that enables the item sorting system 100 to identify a given item during the item identification cycle. For instance, the drive system 106 is configured to move one or more components of the item sorting system 100 such that a component (e.g., the end effector 112, one or more end effector tips 114, the curvature generation device 116, the curvature generation device 120, the light source 121, the recognition device 123, or combinations thereof, are disposed at an optimal position, relative to an item, for identifying the item. For instance, the drive system 106 is configured to position the item sorting system 100, or individual components thereof, as being centered over a particular one of the bins 103, centered over an item to be identified in the bins 103, or positioned relative to the item in a manner that is likely to create a secure connection between the item and the end effector tips 114.

Figure 2A:
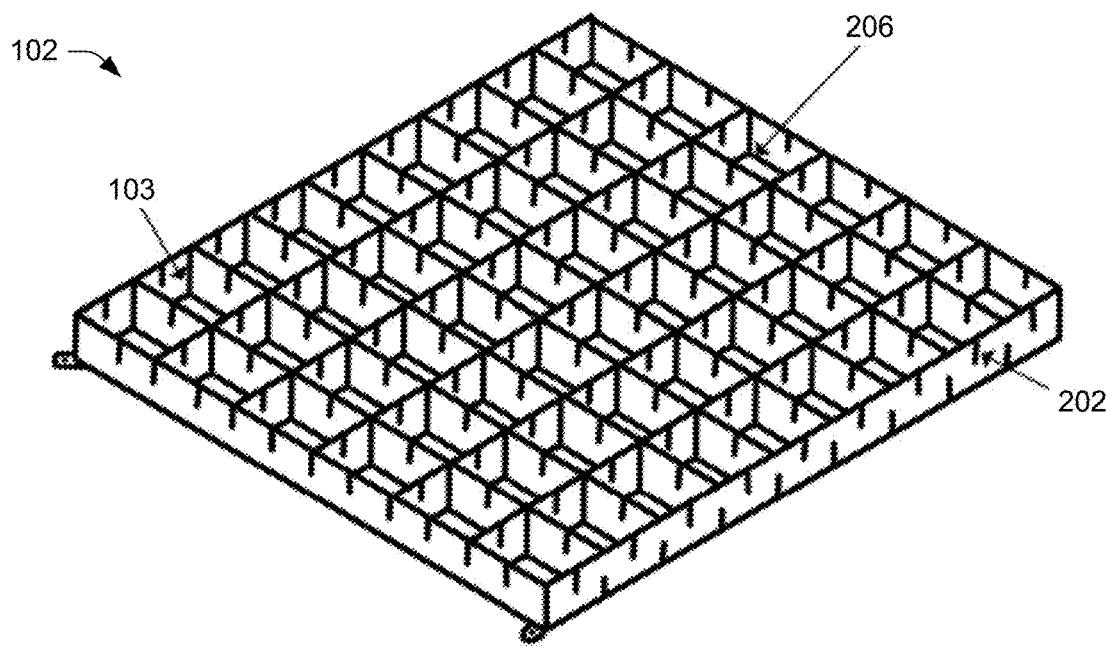
FIG. 2A illustrates a first perspective view of an example bin system implemented as part of the example item sorting system illustrated in FIGS. 1A-1D.
Figure 2B:
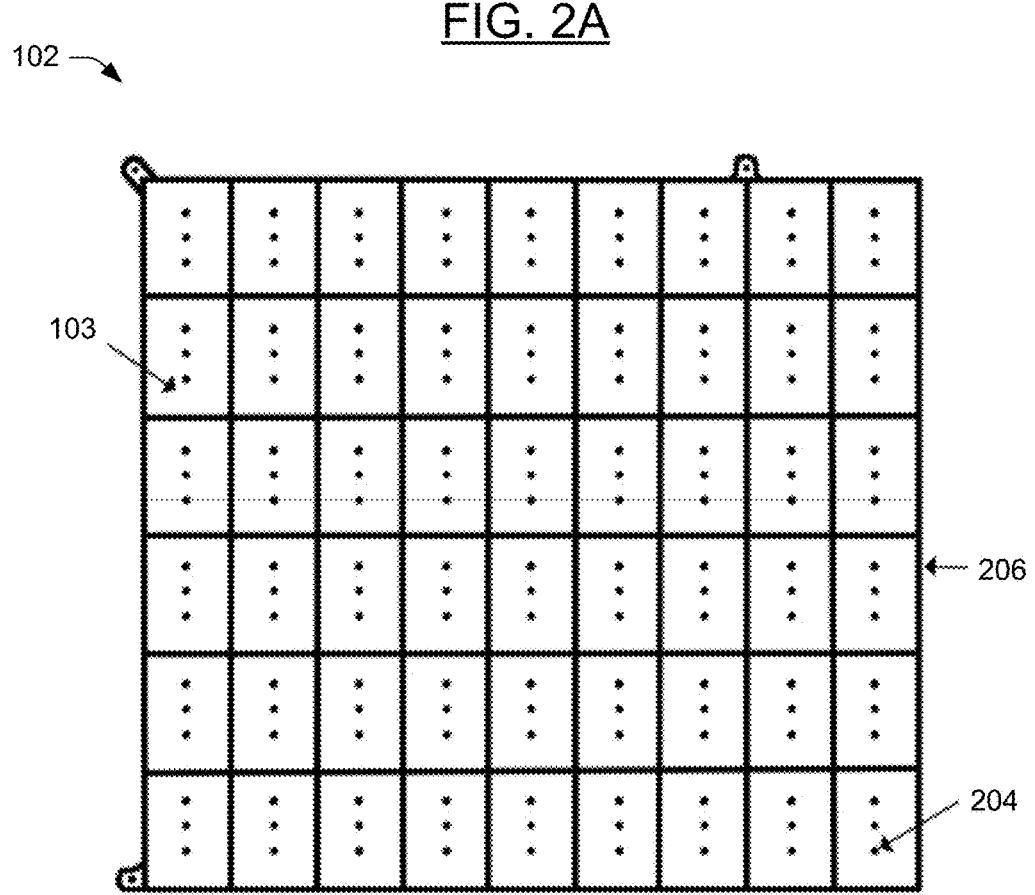
FIG. 2B illustrates a second perspective view of the example bin system illustrated in FIG. 2A.
Figure 2C:
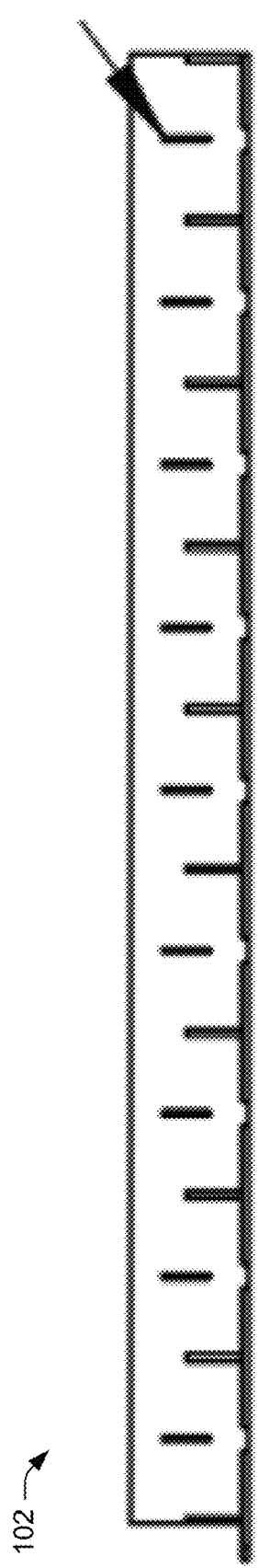
FIG. 2C illustrates a third perspective view of the example bin system illustrated in FIGS. 2A and 2B.

FIG. 2A illustrates a first perspective view of an example bin system implemented as part of the item sorting system 100. FIG. 2B illustrates a second perspective view of the example bin system implemented as part of the item sorting system 100. FIG. 2C illustrates a third perspective view of the example bin system implemented as part of the item sorting system 100.

In the illustrated examples of FIGS. 2A-2C, the bins 103 are depicted as being organized in a grid. Although depicted as being organized with respect to a particular grid configuration, the item sorting system 100 is configured to implement any number of bins 103 arranged in any configuration without departing from the spirit or scope of the techniques described herein. In some implementations, a number and arrangement of the bins 103 is selected based on a type of item being sorted, a desired sorting rate, or combinations thereof.

In accordance with one or more implementations, the bins 103 are configured as including walls that are at least partially transparent or translucent and thus allow for light to pass through the walls of the bins 103, which enables improved visual item recognition. Alternatively or additionally, in some implementations the bins 103 are configured as including walls that are opaque. In some implementations, the bins 103 are constructed of glued acrylic or vacuum formed in one or multiple pieces. In some implementations, the bins 103 are machined out of metal or plastic polymer. Thus, although described with respect to certain materials, the bins 103 are constructed using any suitable material or combinations thereof.

As depicted in the illustrated example of FIG. 2A, in some implementations walls of the bins 103 include at least one air passage 202. The air passage 202 enables air to flow between adjacent bins 103, and are configurable in any shape or size, such as holes, slots, squares, combinations thereof, and so forth. In some implementations, to limit an overall physical footprint of the item sorting system 100, the bins 103 are configured to have approximately similar dimensions (e.g., length and width dimensions) as items being stored in the bins 103 for sorting. Limiting the overall physical footprint of the item sorting system 100 in this manner, however, results in minimal space between a stored item (e.g., a card edge) and a wall of a bin in which the item is stored. This minimal space consequently restricts air flow, which can result in delays involved in the overall sorting process. For instance, air trapped in a bin creates resistance on a surface of a card falling into the bin, which consequently increases an amount of time between the card being released by the end effector 112 and being deposited in an intended location. As a further benefit provided by the at least one air passage 202, increased air flow improves a likelihood of item separation (e.g., of the at least one additional card 126 separating from the card 124), which similarly improves an efficiency and accuracy of the overall sorting process.

As a further potential drawback associated with bins 103 designed as having confined storage space relative to their stored items, items stored further towards a base of a bin (e.g., further from the end effector 112) have an increased likelihood of adhering to an interior surface of the bin (e.g., to the base of the bin). As with adherence between cards, the bottom-most item is likely to adhere to the bin base in scenarios where both a surface of an item and a surface of the bin interior are smooth and flat. In such scenarios, a curvature generation device of the end effector 112 may not be able to overcome the adherence force between the item and the interior surface of the bin, due to the bin being of a structure or material is not as flexible as the item adhered to the end effector 112.

In these scenarios, the end effector 112 sticks in the actuated position, adhering to the item while the item contacts the bin base, and fails to retract at all. To account for these scenarios, in some implementations a base of each of the bins includes depressions 204, which are created by etching or removing material from the bin base. The depressions 204 are representative of holes, slots, offset spacers, abrasions on the bin base, combinations thereof, and so forth, which creates a space for air to flow between a bottom-most item (e.g., as disposed in the bin) and the bin base to decrease an adherence force therebetween. In some implementations, the topmost edges of the bins 103 (e.g., edges of one or more walls of the bins 103 disposed furthest from a base of the bins 103) include chamfered or rounded surfaces 206. The chamfered or rounded surfaces 206 bias items released from the end effector 112 towards the bins 103 rather than sitting on the top edge. In this manner, an opening of an individual bin of the bins 103 is provided to facilitate removal of an item from, and deposit of an item into, the bin. The opening of a bin is further designed to avoid a scenario where an item rests on top of the bins 103 rather than being contained in one of the bins 103.

Figure 2D:
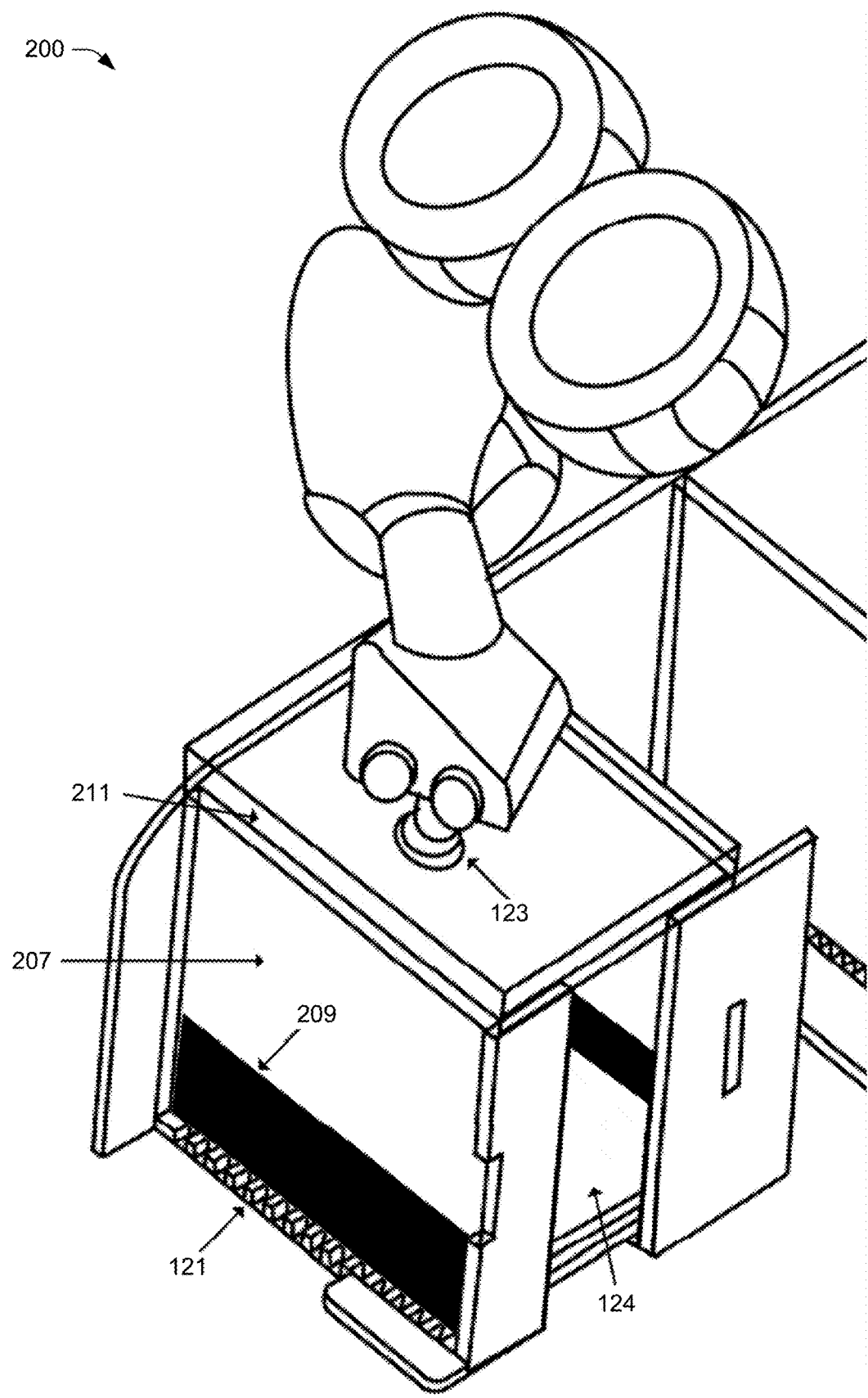
FIG. 2D illustrates a detailed view of the example item sorting system illustrated in FIGS. 1A-1D with the example bin system of FIGS. 2A-2C in accordance with one or more implementations.

FIG. 2D illustrates a detailed view of the item sorting system 100 illustrated in FIGS. 1A-1D with the bin system 102 of FIGS. 2A-2C in accordance with one or more implementations.

FIG. 2D illustrates a different perspective view 200 of the bin system 102 when the recognition device 123 is capturing images of cards within one of the bins 103. In the illustrated example of FIG. 2D, the recognition device 123 is depicted as an abstract camera (e.g., an image capture device) that is representative of a device configured to capture images as part of item recognition. For instance, image data captured by the recognition device is useable by the control system 108 to identify and recognize the card 124 and distinguish the card 124 from the at least one additional card 126. In some implementations, the recognition device 123 is coupled or otherwise attached to bin shroud 211. Bin shroud 211 is configured as having one or more holes through which the recognition device 123 is able to capture one or more images an item stored in the bins 103 (e.g., one or more images of the card 124). In some implementations, holes in the bin shroud 211 are additionally or alternatively useable for illumination of the bins 103 (e.g., useable to pass through light emitted by the light source 121).

In some implementations, one or more of the bin shroud 211 or the recognition device 123 are physically attached or otherwise connected to the end effector 112. Via attachment to the end effector 112, the bin shroud 211 and/or the recognition device 123 are moveable by the control system 108 into position relative to individual ones of the bins 103 for image capture and recognition (e.g., identification) of items disposed in the bins 103. Via connection to the end effector 112, the bin shroud 211 and/or the recognition device 123 are configured to identify items disposed in a bin while the end effector 112 is removing items from the bin (e.g., identify a card while the end effector 112 is removing the card from a bin). In some implementations, bin shroud 211 is configured using a material having that is configured to prevent external light from entering the bin (e.g., light other than light provided by a light source of the item sorting system 100) during item recognition and/or extraction from the bins 103.

For instance, in some implementations, the bin shroud 211 is configured using a designated color (e.g., black or white) that limits an amount of external light that penetrates the bin and/or is reflected by one or more interior surfaces of the bin. Alternatively or additionally, in some implementations the bin shroud 211 is configured as having a defined shape, such as a flat shape (e.g., relative to a plane perpendicular to vertical walls of the bins 103), parabolic, trough-shaped, conical, pyramidal, combinations thereof, and so forth. In this manner, the bin shroud 211 is representative of a variety of geometric, material, and color configurations that are designed to cover at least one of the bins 103, block external light from entering, mitigate internal light reflecting within a bin, or combinations thereof. In some implementations, the bin shroud 211 is configured with internal surfaces (e.g., surfaces facing an opening of a bin) oriented in a manner that directs light to one or more portions of a bin that otherwise receive uneven illumination from a light source of the item sorting system 100.

In some implementations, the light source of the item sorting system 100 is configured to emit light that is transferred into an interior of one or more of the bins 103 via illuminated walls 207 of the bins 103. The illuminated walls 207 are representative of vertical components of the bins 103 that extend generally along an axis between a base of the bins towards the end effector 112. The illuminated walls 207 are configured as being at least partially transparent or translucent and configured to receive light from a light source along a first surface (e.g., a surface disposed parallel to, or integrated as part of a base of the bins 103) and emit (e.g., diffuse) the light from a second surface that is oriented generally perpendicular to the first surface. In implementations, the illuminated walls 207 are fabricated from an at least partially transparent material, such as acrylic, glass, and the like.

Figure 2E:
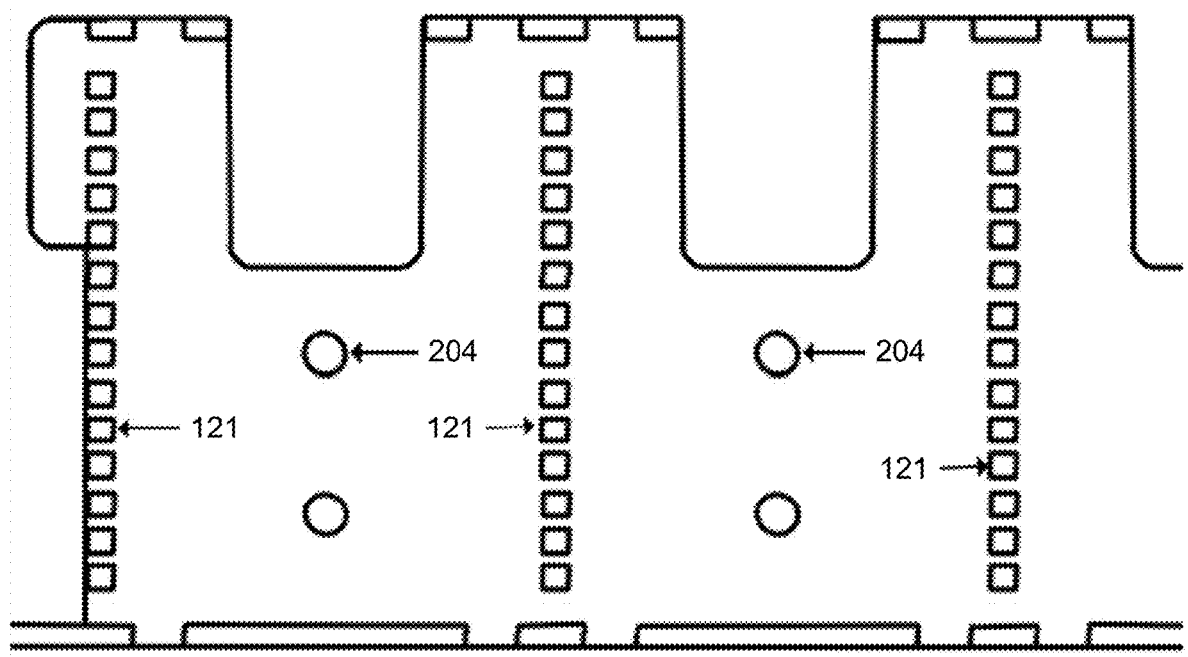
FIG. 2E illustrates an example of a base of a bin system implemented by the item sorting system illustrated in FIGS. 1A-1D in accordance with one or more implementations.

FIG. 2E illustrates an example of a base of a bin system 102. As depicted in the illustrated example of FIG. 2E, the base of the bin system 102 includes light sources 121 and depressions 204. In implementations, a positioning of the light sources 121 is configured so that there is a gap between the light source and the illuminated wall 207 positioned above the light source. Alternatively or additionally, in some implementations there is no gap between a light source and a corresponding one or more illuminated walls 207 that are configured to receive light from the light source.

Figure 2F:
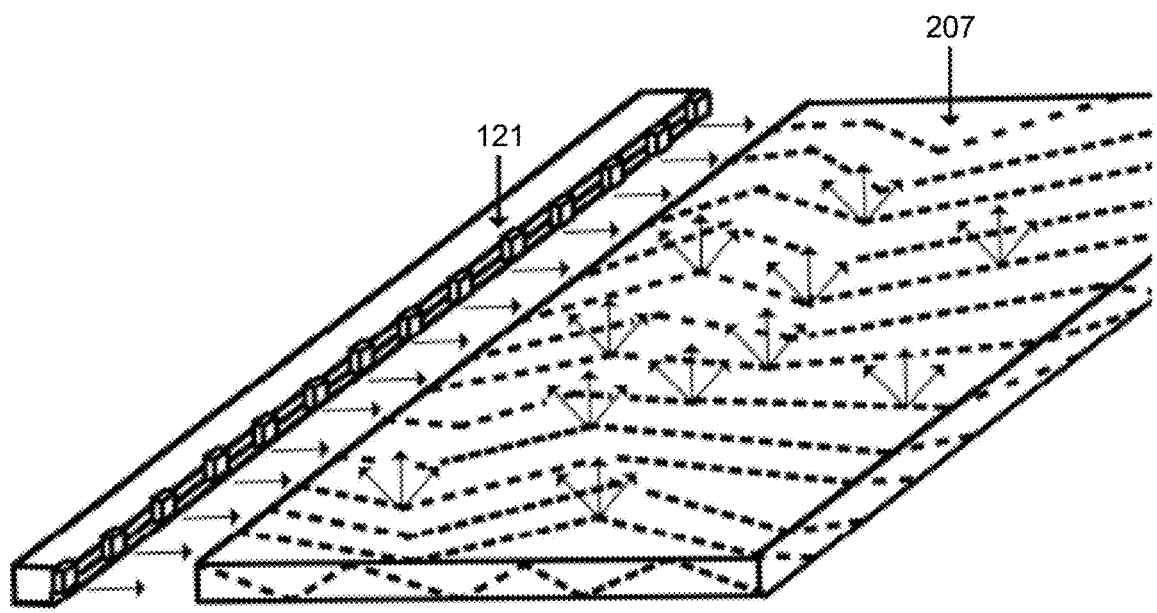
FIG. 2F illustrates a wall of a bin system implemented by the item sorting system illustrated in FIGS. 1A-1D configured to illuminate contents of a bin in accordance with one or more implementations.

FIG. 2F depicts an example of how illuminated walls 207 receive light along a first edge or surface and diffuse the light for emission at a second edge or surface. Although depicted as being emitted from only a single edge or surface (e.g., the second edge), in some implementations the illuminated walls are configured to emit light from multiple surfaces, such as from a third edge or surface that is disposed parallel to the second surface, from a fourth edge or surface that is disposed generally perpendicular to the second and third surfaces (e.g., parallel to and opposite the first surface), or combinations thereof. In some implementations, the illuminated walls 207 are constructed from a material that includes (e.g., is embedded with) clear light-diffusing particles that deflect the light rays entering an illuminated wall edge (e.g., from a light source of the item sorting system 100).

In implementations, including the clear light-diffusing particles in the illuminated walls 207 suppresses a total internal reflection for individual walls of the illuminated walls. By suppressing a total internal reflection of the illuminated walls 207, the illuminated walls 207 are configured to emit light received from a light source of the item sorting system 100 in a controlled manner, thus providing a surface that uniformly illuminates contents of a bin. In some implementations, the bins 103 are constructed such that only a portion of walls defining a bin are configured as illuminated walls 207. Alternatively or additionally, the bins 103 are configured such that all walls defining a bin are configured as illuminated walls 207.

In some implementations, one or more of the illuminated walls 207 are configured as including a light mask 209, as depicted in the illustrated example of FIG. 2D. The light mask 209 is representative of one or more regions of an illuminated wall that is configured as an opaque, light-absorbing region, or a reflective (e.g., light reflecting) region, or a combination thereof. For instance, in some implementations, the light mask 209 includes a light-absorbing side that contacts (e.g., adheres to) a face of an illuminated wall defining an interior surface of a bin, with an opposite side that is reflective to face the interior of the bin. In such an example configuration, the light mask 209 is designed to absorb a portion of light emitted (e.g., by a light source 121 of the item sorting system 100) to control a level of illumination (e.g., a degree of brightness) at a portion of the bin interior where the light mask 209 is disposed. Alternatively or additionally, the light mask 209 is configured such that both sides are light absorbing or such that both sides are reflective.

As a specific example, FIG. 2D illustrates a scenario where the light mask 209 is used to reduce a brightness at a bottom of a bin to achieve a more even distribution of light in the bin, which otherwise (e.g., without the light mask 209) would result in a scenario where a lower portion of the bin exhibits increased brightness due to the light source 121 being disposed beneath the bin. The light mask 209 is thus useable to achieve desired illumination conditions for identification of an object stored in the bin (e.g., by the recognition device 123) without requiring that different image capture settings (e.g., camera settings such as exposure, aperture, shutter speed, ISO, and so forth) as items are recognized at various depths in the bin relative to a position of the end effector 112.

In some implementations, the illuminated walls 207 are configured to vary an intensity of illumination for one or more of the bins 103 based on various conditions, such as a mode of operation or status of the item sorting system 100, or one or more components included in the item sorting system 100. As a specific example, in some implementations the illuminated walls 207 cause one or more of the bins 103 to be illuminated using a designated color (e.g., red) to provide an indication of issues or errors occurring within the bin. For instance, in an example scenario where the recognition device 123 is unable to adequately identify an item stored in a bin relative to a threshold confidence level (e.g., if the recognition device 123 is statistically unsure as to what an item is), the illuminated walls 207 are configured to adjust an illumination level of the bin over any number of identification cycles, where each identification cycle represents an attempt by the item sorting system 100 of identifying an individual object stored in the bin.

In a similar manner, the end effector 112 is programmed to adjust a manner in which an item is manipulated during an identification cycle. For instance, in an example scenario where the recognition device 123 is unable to adequately identify an item stored in a bin relative to a threshold confidence level, the end effector 112 is configured to adjust a degree and/or way in which an item is manipulated. As a specific example, if during a first identification cycle the end effector 112 imparts a curvature defined by a first bend radius to an item and the recognition device 123 is unable to identify the item, the end effector 112 may be caused to impart a different curvature defined by a second bend radius that is different than the first bend radius during a subsequent identification cycle. By imparting different bend radii, the end effector 112 is caused to manipulate the item adhered to the end effector tip(s) 114 in a way that enables the recognition device 123 to capture different angles of the item, reduce glare reflecting from a surface of the item, and so forth. In addition or alternatively to imparting different bend radii over different identification cycles, the end effector 112 is able to attempt different manipulations (e.g., different degrees of twisting, vibrating, etc.) of an adhered item until the recognition device 123 is able to identify an item with at least a threshold confidence level.

For instance, in response to determining that an item was not confidently recognized (e.g., according to a recognition algorithm implemented by the control system 108) during a first identification cycle for the item, the end effector 112 is configured to articulate an item adhered to the end effector tips 114 in a different manner during a second identification cycle. As a specific example, if during the first identification cycle the end effector tips 114 were used to impart a slight curvature on the item, during the second identification cycle the end effector tips are caused to gently twist the item back and forth (e.g., to enable image capture and recognition without glare that may have been caused by light reflecting off a surface of an item at a problematic angle resulting from the slight curvature imparted during the first item recognition cycle). The end effector 112 and the illuminated walls 207 are configured to change conditions during different item recognition cycles independently or in unison with one another (e.g., the illuminated walls 207 decrease a brightness of the bin during the second recognition cycle in the specific example described above).

In scenarios where item identification fails after a threshold number of cycles (e.g., due to problems with the light source 121, the end effector 112, the recognition device 123, and/or other components of the item sorting system 100), the illuminated walls 207 are configured to cause one or more of the bins 103 to emit a predefined color indicating a problem with the one or more of the bins 103. For instance, illuminating a specific bin with the color red while others of the bins 103 are illuminated white visually notifies a human operator of the item sorting system 100 that a problem exists with the red bin and alerts that further inspection and/or repair is required for accurate sorting. Alternatively or additionally, the light source 121 and the illuminated walls 207 are configured to reduce brightness (e.g., cease illuminating or decrease illumination of) one or more of the bins 103 that are not actively involved in a current sorting step, while maintaining or increasing a brightness of bins 103 involved in the current sorting step.

Figure 2G:
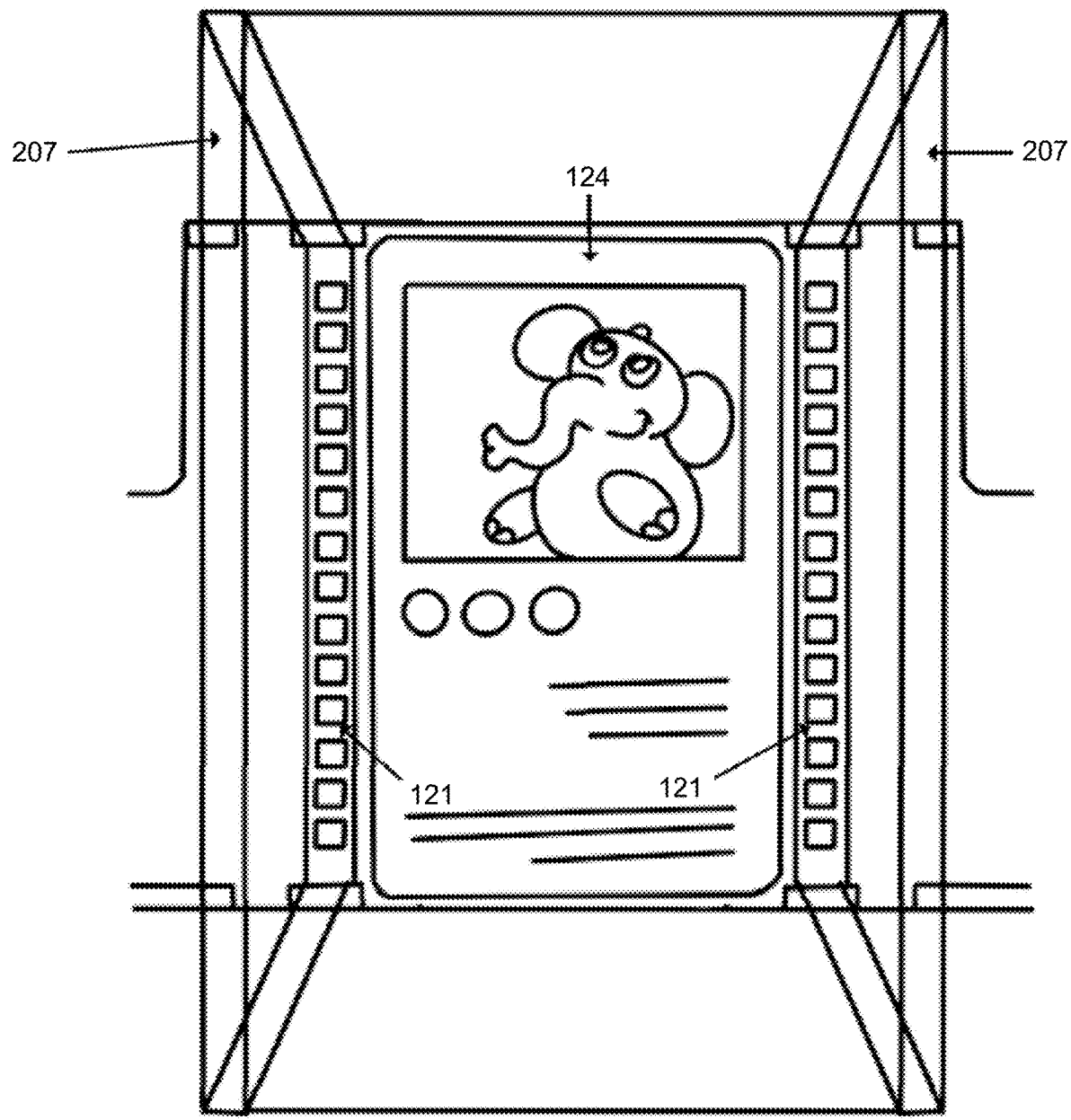
FIG. 2G illustrates an example of contents of a bin system implemented by the item sorting system illustrated in FIGS. 1A-1D being illuminated by at least one wall of the bin in accordance with one or more implementations.

FIG. 2G illustrates an example of contents of a bin implemented by the item sorting system 100 as being illuminated by one or more illuminated walls 207 in accordance with one or more implementations.

As depicted in the illustrated example of FIG. 2G, the illuminated walls 207 are configured for placement proximal to (e.g., above) one or more illumination sources (e.g., light source 121). The illustrated example of FIG. 2G specifically depicts a scenario where card 124 is illuminated for item recognition by two illuminated walls 207, which are each illuminated by the light source 121. Although described in the context of being a single light source, in some implementations the light source 121 is representative of multiple light sources, such that each of the rectangles disposed below the illuminated walls 207 are representative of an individual light source. In a similar manner, although depicted in the illustrated example as illuminating the card 124 using two illuminated walls 207, in some implementations the card 124 is illuminate within a bin including fewer than two illuminated walls 207 or more than two illuminated walls 207. For instance, in some implementations the card 124 is illuminated by the light source 121 independent of any illuminated walls 207. Alternatively, in some implementations every wall defining a perimeter of the bin is configured as an illuminated wall 207. Regardless of a specific configuration, the item sorting system 100 is configured to evenly illuminate the card 124 via use of the illuminated walls 207, which consequently reduces an amount of preprocessing and/or postprocessing required to be performed (e.g., by the control system 108) as part of identifying the card 124 by creating improved lighting conditions for image capture by the recognition device 123.

As referenced throughout, the item sorting system 100 is configured to store items and is thus representative of an item inventory management system. The item sorting system 100 is further configurable in a range of sizes, such as larger, or smaller, than the table-top form factor referenced throughout the disclosure herein, to accommodate any number and/or size of items.

For example, to adequately store sufficient items to manage an entire inventory, in some implementations the form factor of the item sorting system 100 is configured as having an increased length and/or width relative to the illustrated examples. In some implementations, a single instance of the item sorting system 100 is stacked on top of one or more other instances of the item sorting system 100. This sorting system stacking reduces a physical footprint of the item sorting system 100. In this specific stacking implementation, the bin walls (e.g., the illuminated walls 207) are positioned perpendicular to a base of the item sorting system 100.

In such stacking implementations, an outer wall of the bin system 102 is removed and replaced with a slide system, which offers improved processing of item stacks relative to bins having shallower depths. For instance, using a slide system avoids a scenario where shallow bins would eventually fill and instead permits a slide (e.g., a chute) to redirect sorted items into a hopper, storage, or other item storage component (e.g., another item sorting system 100). Such an example configuration enables constant loading of items (e.g., stacks of cards) without having to stop a sorting process to unload bins that contain a portion of the sorted items. As evidenced by these specific examples, the described techniques and systems are not so limited to the particular configurations and examples described herein.

When a single item sorting system 100 is coordinated with one or more other item sorting systems 100, multiple stacked or connected item sorting systems 100 are configured to operate in unison to collate an output of sorted items (e.g., an output stack of sorted cards) from outputs of each item sorting system 100. This may be advantageous when items that are to be output in a final sorting order (e.g., a final output stack of cards) are not all stored in the same item sorting system 100. Multiple item sorting systems 100 are thus configurable for networking and linking via a central processing platform, as described in further detail below with respect to FIG. 4, which determines what items each item sorting system 100 needs to output, and in what order, to aggregate an overall output sorting order for the multiple item sorting system 100 configuration. As one example, each individual item sorting system 100 is caused to generate a local output sort order, which is subsequently recombined by a centralized and final sort process to create a final output sort order from the various local output sort orders that each correspond to an individual item sorting system 100.

In some implementations, the item sorting system 100 is configured to handle sorting of different items sets concurrently. By operating on multiple different item sets simultaneously, the item sorting system 100 is configured to reduce an overall amount of time required to sort each item set, while also enabling for prioritization of sorting one or more specific item sets. For instance, if the control system 108 identifies that a particular set of items is associated with a high priority, the control system 108 is configured to cause the item sorting system 100 to operate only on the particular set of items and abstain from sorting other item sets until the particular set of items is sorted. Alternatively, instead of abstaining from sorting any other item set, the control system 108 is configured to cause the item sorting system 100 to greedily select to sort items of the particular set during a given recognition cycle (e.g., during a single cycle in which the end effector 112 is manipulated to identify an item) and only select to sort an item of a different item set during a recognition cycle when it is impossible to sort items of the particular set.

Figure 3A:
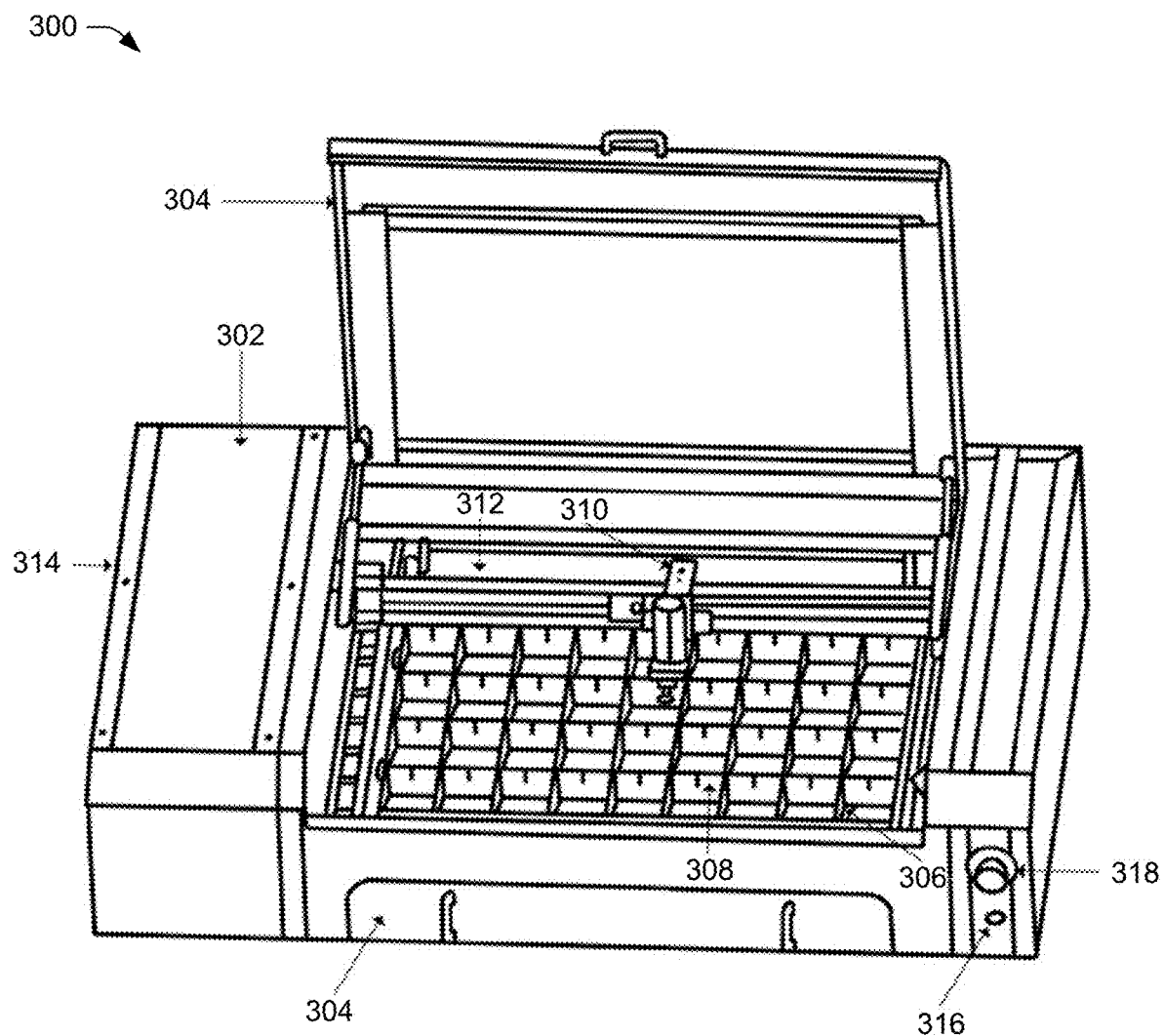
FIG. 3A illustrates a first perspective view of a system configured for card sorting using one or more components of FIGS. 1A-2G.
Figure 3B:
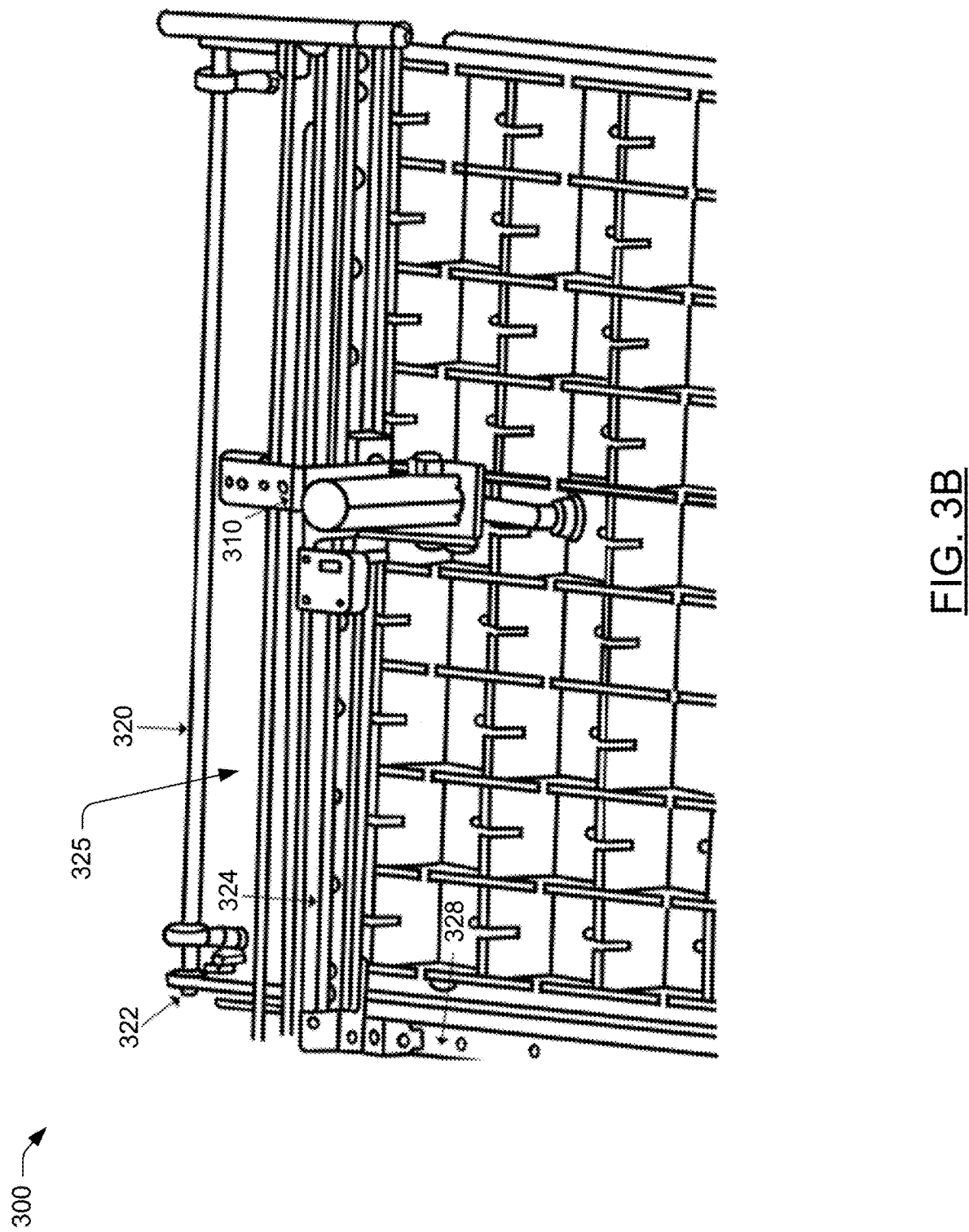
FIG. 3B illustrates a second perspective view of the system configured for card sorting illustrated in FIG. 3A.
Figure 3C:
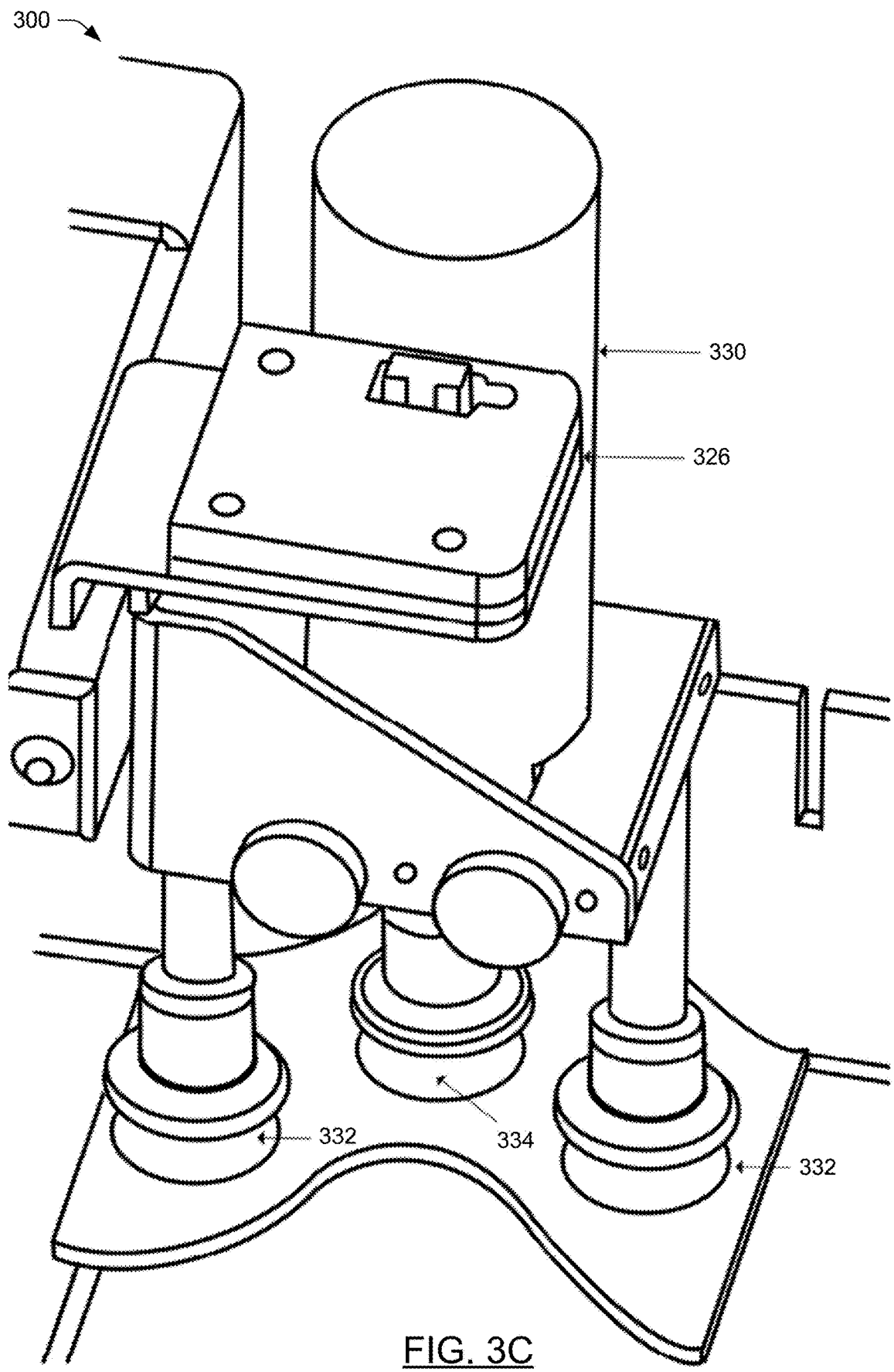
FIG. 3C illustrates a third perspective view of the system configured for card sorting illustrated in FIGS. 3A and 3B.
Figure 3D:
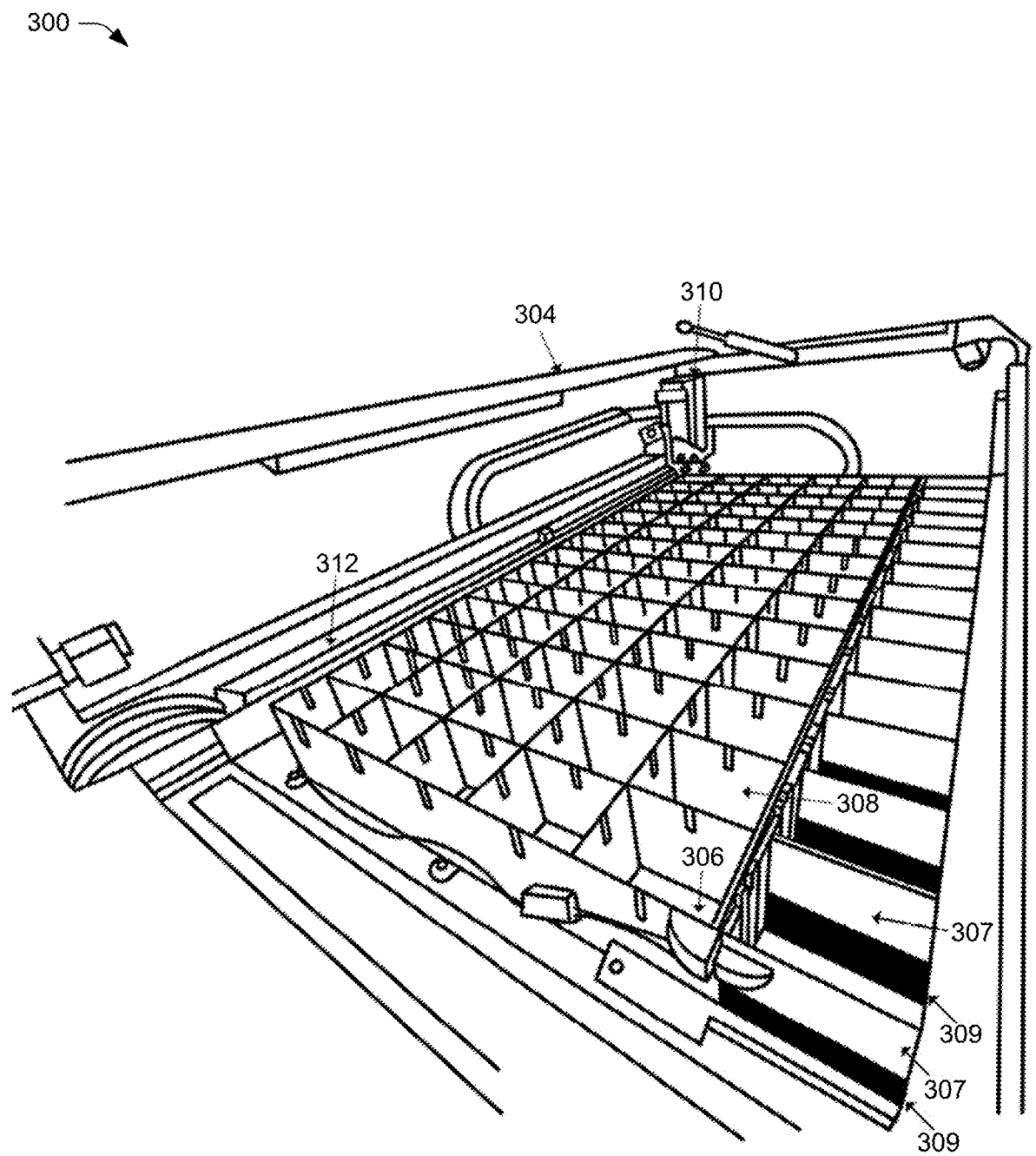
FIG. 3D illustrates a fourth perspective view of the system configured for card sorting illustrated in FIGS. 3A-3C.

FIG. 3A illustrates a first perspective view of a system 300 configured for card sorting using one or more components of FIGS. 1A-2G, FIG. 3B illustrates a second perspective view of the system 300, FIG. 3C illustrates a third perspective view of the system 300, and FIG. 3D illustrates a fourth perspective view of the system 300.

The system 300 is representative of an example configuration of the item sorting system 100 in accordance with one or more implementations. As depicted in the illustrated example of FIG. 3A, the system 300 includes a housing 302, doors 304, a bin system 306 including bins 308, an item handling system 310, a drive system 312, a control system 314, an interface 318, and a communication port 316. The bin system 306 represents an example configuration of bin system 102, the item handling system 310 represents an example configuration of the item handling system 104, the drive system 312 represents an example configuration of the drive system 106, the control system 314 represents an example configuration of the control system 108, and the interface 318 represents an example configuration of the item handling system 310.

The bin system 306 is configured to hold and store items to be sorted, inventoried, and managed. In some implementations, the bin system 306 is configured to hold and store cards to be sorted, inventoried, and managed. The bin system 306 includes a number of bins 308 that allow for input card stacks to be placed into the system 300. In this example, the system 300 is configured to remove cards from one or more of the bins 308 defined as input bins and identify individual cards from the input bins using a recognition algorithm. Example cards sorted on the system 300 include collectable cards, sports cards (i.e. baseball, basketball, football), playing cards, other card-based games, other printed surfaces (e.g., currency, documents, etc.), combinations thereof, and so forth. Although described and illustrated in the specific context of being configured for card sorting, the system 300 is configurable to sort other items such as toys, blocks, nails, screws, and so forth.

The item handling system 310 and the drive system 312 are configured to operate in combination to move items (e.g., one at a time) via linear motion of system 300 components. To do so, the drive system 312 is configured to employ separate axes for different planar dimensions of the bins 308, which work in unison to coordinate the placement of the item handling system 310 over a specified bin involved in a given sorting step (e.g., a bin storing an item being identified during a given identification cycle). For example, the item handling system 310 and the drive system 312 are configured to move cards one at a time for removal from a first one of the bins 308 and placement into a second one of the bins 308. The item handling system 310 works above the bin system 306, reaching down into one of the bins 308 to retrieve an item from the bin utilizing a vacuum, or release an item into the bin.

As illustrated in FIG. 3B, the drive system 312 is configured to move the item handling system 310 (e.g., with two-dimensional linear motion) to position the item handling system 310 over respective ones of the bins 308. The drive system 312 includes a coupling rod 320, one or more stepper motors (not depicted), drive belt 322 and drive belt 324, gantries 325, and linear rails 328. The gantries 325 are driven by the stepper motors connected to the drive belt 322 and the device belt 324 which push and pull the gantries 325. To reduce friction during travel, ball bearings or ball bearing carriages are be used with the linear rails 328 in accordance with one or more implementations.

As illustrated in FIGS. 3B, 3C and 3D, the item handling system 310 includes vacuum end effector 330 and end effector tips 332. The item handling system 310 utilizes the vacuum end effector 330 to manipulate (e.g., pick up, move, and release) an item during one or more sorting operations. The vacuum end effector 330 is configured to pick up an item (e.g., card) using vacuum force or negative pressure acting on an area of the item, resulting in a holding force that adheres the item to the vacuum end effector 330. In some implementations, the vacuum is generated by a pump or syringe which evacuates air from an enclosed volume within the vacuum end effector 330. This evacuation from the enclosed volume within the vacuum end effector 330 causes the vacuum end effector 330 to actuate and extend towards an item stored in a bin (e.g., actuate and extend downward towards a base of the bins 308). Specifically, the vacuum end effector 330 extends downward from a resting position towards a topmost item in a stack (e.g., a topmost card in a stack of cards), creates a seal between the end effector tips 332 and the topmost item, and retracts back towards the resting position with the topmost item adhered to the end effector tips 332.

In implementations, the end effector tips 332 are constructed of a material that reduces potential item damage. For example, the end effector tips 332 are constructed from one or more of a soft rubber, foam, plastic polymer, silicone cup, and so forth. The end effector tips 332 are configured to flex slightly upon contact with an item (e.g., card) in a manner that enables creation of a seal while reducing an impact or potentially damaging force imparted to the item. The vacuum and kinetic motion of the vacuum end effector 330 together decouple the forces which hold and move the item (e.g., card), and thus allow relatively larger forces to act in moving the item. This combination increases a speed of sorting a set of items, while keeping the forces which directly interact with the item minimal and distributed across one or more surfaces of an item.

In some implementations, the vacuum end effector 330 is configured to include one or more curvature generation devices. For instance, as illustrated in FIG. 3C, one or more of the end effector tips 323 are configured to function as a curvature generation device 334. The curvature generation device 334 is thus representative of an example configuration of the curvature generation device 116 or the curvature generation device 120 described above, and ensures that only one item (e.g., a single card) is manipulated during a sorting operation. In unison with the vacuum end effector 330, the curvature generation devices 334 imparts a curvature to the top item (e.g., card) when the vacuum end effector 330 is retracted while the item is adhered to the end effector tips 332.

The curvature of the item induced by the curvature generation device 334 creates separation between the item and one or more other items that may be inadvertently adhered to the item (e.g., due to static forces, surface imperfections, contaminants, and so forth). The adhering force that inadvertently couples the item to the one or more other items decreases as a result of decreased contact area caused by the curvature generation device 334. In implementations, gravity then overcomes the adhering force that inadvertently couples the item to the one or more other items and the one or more other items are caused to fall back into the bins 308. As such, reliable item identification (e.g., identification of an individual card) and transportation among different ones of the bins 308 is enabled by the curvature generation device 334.

The item handling system 310 further includes an illumination and recognition device 326. The illumination and recognition device 326 represents functionality of the light source 121 and the recognition device 123 as described above, and is thus configured to illuminate and identify items (e.g., objects) located within the bins 308. As shown in FIG. 3D, illuminating walls 307 are example instances of the illuminated walls 207 described above, which may be used in place of, or in addition to, an illumination portion of the illumination and recognition device 326. As described above with respect to the illuminated walls 207, in some implementations the illuminating walls 307 are configured to include one or more light masks 309 to reduce concentrations of light at various portions of a bin to effectively achieve uniform illumination across all portions (e.g., at different depths) of a bin.

Having discussed exemplary details of an item handling system configured to enable the techniques described herein, consider now an example of a system and device that can be utilized to control the item handling system and implement the various techniques described herein.

Figure 4:
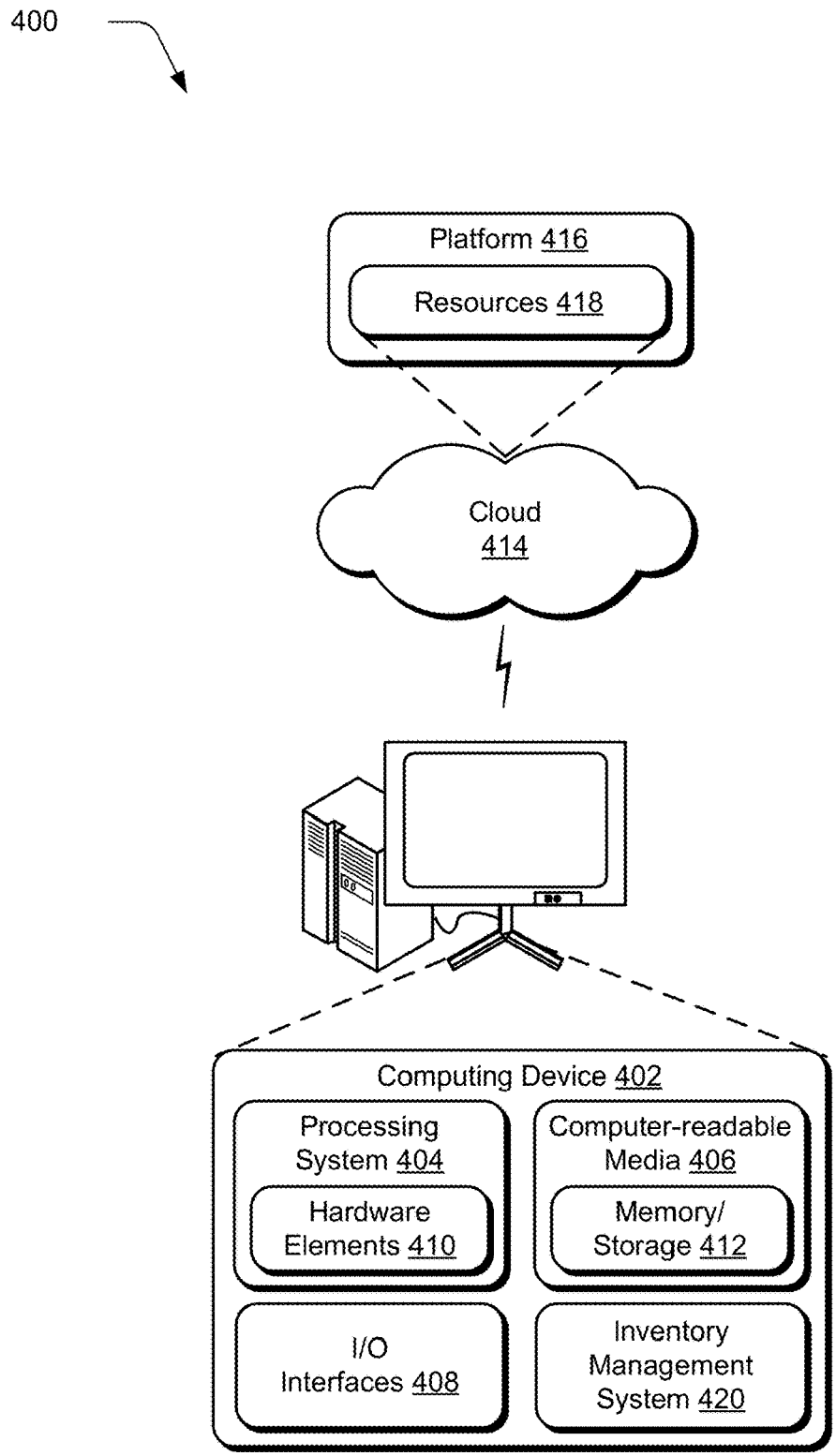
FIG. 4 illustrates an example of a system including various components of an example computing device configured to facilitate operation of the item sorting system as described and/or utilized with reference to FIGS. 1A-3D to implement the techniques described herein.

FIG. 4 illustrates an example of a system 400 that includes an example of a computing device 402 that is representative of one or more computing systems and/or devices that may implement the various techniques described herein. This is illustrated through inclusion of the inventory management system 420. The computing device 402 is representative of, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O interfaces 408 that are communicatively coupled, one to another. Although not depicted in the illustrated example, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 406 is illustrated as including memory/storage 412. The memory/storage 412 represents memory/storage capacity associated with one or more computer-readable media. The memory/storage 412 may include volatile media (such as random-access memory (RAM)) and/or nonvolatile media (such as read only memory (ROM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

Input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information thereon, such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 410 and computer-readable media 406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of a module that is executable by the computing device 402 as software may be achieved at least partially in hardware, e.g., through use of computer-readable storage media and/or hardware elements 410 of the processing system 404. The instructions and/or functions may be executable/operable by one or more articles of manufacture (for example, one or more computing devices 402 and/or processing systems 404) to implement techniques, modules, and examples described herein.

The techniques described herein may be supported by various configurations of the computing device 402 and are not limited to the specific examples of the techniques described herein. This functionality may also be implemented all or in part through use of a distributed system, such as over a "cloud" 414 via a platform 416 as described below.

The cloud 414 includes and/or is representative of a platform 416 for resources 418. The platform 416 abstracts underlying functionality of hardware (e.g., servers) and software resources of the cloud 414. The resources 418 may include applications and/or data that can be utilized while computer processing is executed on servers that are remote from the computing device 402. Resources 418 can also include services provided over the Internet and/or through a subscriber network, such as a cellular or Wi-Fi network.

The platform 416 may abstract resources and functions to connect the computing device 402 with other computing devices. The platform 416 may also serve to abstract scaling of resources to provide a corresponding level of scale to encountered demand for the resources 418 that are implemented via the platform 416. Accordingly, in an interconnected device embodiment, implementation of functionality described herein may be distributed throughout the system 400. For example, the functionality may be implemented in part on the computing device 402 as well as via the platform 416 that abstracts the functionality of the cloud 414.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. An apparatus comprising:
   a light source;
   at least one bin that includes at least one wall that directs light from the light source to illuminate one or more items stored in the at least one bin, the at least one wall configured to receive the light from the light source at a first surface of the at least one wall and illuminate the one or more items stored in the at least one bin by emitting the light from a second surface of the at least one wall;
   a recognition device that identifies the one or more items stored in the at least one bin by capturing images of the one or more items stored in the at least one bin; and
   an end effector that manipulates the one or more items stored in the at least one bin, the end effector comprising at least two end effector tips, the at least two end effector tips comprising a component configured to apply a vacuum force to an item of the one or more items, and the at least two end effector tips configured to impart a curvature on the item of the one or more items to avoid one or more other items from inadvertently adhering to the item of the one or more items.

2. The apparatus of claim 1, wherein the first surface of the at least one wall is perpendicular to the second surface of the at least one wall.

3. The apparatus of claim 1, wherein the at least one wall is at least partially transparent.

4. The apparatus of claim 1, wherein the at least one wall includes a first portion that is masked to absorb light emitted by a second portion of the at least one wall.

5. The apparatus of claim 1, wherein the at least one bin includes an opening disposed opposite a base of the at least one bin, wherein the opening facilitates removal of the one or more items from the at least one bin and deposit of the one or more items into the at least one bin.

6. The apparatus of claim 5, wherein the at least one wall is disposed on a first surface of the base and the light source is disposed on a second surface of the base, wherein the first surface of the base and the second surface of the base are parallel surfaces that define opposite sides of the base.

7. The apparatus of claim 1, further comprising a drive system configured to control positioning of the recognition device relative to the at least one bin.

8. The apparatus of claim 1, further comprising a drive system configured to control positioning of the end effector relative to the at least one bin.

9. The apparatus of claim 1, wherein a first one of the at least two end effector tips is positioned at a first end of the end effector and a second one of the at least two end effector tips is positioned at a second end of the end effector that is located opposite the first end of the end effector.

10. The apparatus of claim 1, wherein the at least two end effector tips comprise a flexible material that avoids damaging the item while applying the vacuum force to the item.

11. The apparatus of claim 1, wherein the at least two end effector tips impart the curvature to the item of the one or more items by asymmetrical retraction relative to the end effector, wherein the curvature to the item reduces a static force adhering the item to a different item of the one or more items.

12. The apparatus of claim 1, wherein the at least one wall of the at least one bin includes one or more air passages that enable air flow within the at least one bin.

13. The apparatus of claim 1, wherein the at least one bin comprises a chamfered edge to bias the one or more items into the at least one bin.

14. The apparatus of claim 1, further comprising an inventory management system that executes a sorting algorithm that causes the end effector to sort the one or more items according to a designated sort order.

15. The apparatus of claim 14, wherein the designated sort order is specified via input to a user interface of the inventory management system.

16. A system comprising:
a light source;
at least one bin comprising at least one wall that directs light from the light source to illuminate a plurality of cards stored in the at least one bin, the at least one wall configured to receive the light from the light source at a first surface of the at least one wall and illuminate the plurality of cards stored in the at least one bin by emitting the light from a second surface of the at least one wall;
a recognition device configured to individually identify the plurality of cards by capturing images of the plurality of cards; and
an end effector configured to manipulate the plurality of cards, the end effector comprising at least two end effector tips, the at least two end effector tips comprising a component configured to apply a vacuum force to a card of the plurality of cards, and the at least two end effector tips configured to impart a curvature on the card to avoid one or more other cards of the plurality of cards from inadvertently adhering to the card.

17. The system of claim 16, wherein the at least one wall is at least partially transparent.

18. A method, comprising:
directing light from a light source via at least one wall of at least one bin to illuminate one or more items stored in the at least one bin, the at least one wall receiving the light from the light source at a first surface of the at least one wall and illuminating the one or more items stored in the at least one bin by emitting the light from a second surface of the at least one wall;
identifying, by a recognition device, the one or more items stored in the at least one bin by capturing images of the one or more items stored in the at least one bin; and
manipulating, by an end effector, the one or more items stored in the at least one bin, the end effector comprising at least two end effector tips that are operable to:
apply a vacuum force to an item of the one or more items by a component of the at least two end effector tips; and
impart a curvature on the item of the one or more items to avoid one or more other items from inadvertently adhering to the item of the one or more items.

19. The method of claim 18, wherein the at least two end effector tips impart the curvature to the item of the one or more items by asymmetrical retraction relative to the end effector, wherein the curvature to the item reduces a static force adhering the item to a different item of the one or more items.

20. The method of claim 18, further comprising controlling a positioning of the recognition device relative to the at least one bin via a drive system.

* * * * *